US006414454B1

(12) United States Patent
Lhotak et al.

(10) Patent No.: US 6,414,454 B1
(45) Date of Patent: *Jul. 2, 2002

(54) PASS POINT SYSTEM FOR CONTROLLING THE OPERATION OF MOVABLE BARRIERS

(75) Inventors: Roger William Lhotak, Hanover Park; James Joseph Fitzgibbon, Streamwood; Robert John Olmsted, Wood Dale; Kenneth J. Dombrowski, Wheaton, all of IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/389,176

(22) Filed: Sep. 2, 1999

Related U.S. Application Data

(63) Continuation of application No. 09/041,351, filed on Mar. 12, 1998, now Pat. No. 6,051,947.

(51) Int. Cl.[7] .................................................. H02K 7/00
(52) U.S. Cl. ..................... 318/266; 318/282; 318/286; 318/468; 318/626; 49/28
(58) Field of Search ................................ 318/280–300, 318/445–489, 255–267, 600–603, 626, 264, 266; 49/26–28, 31

(56) References Cited

U.S. PATENT DOCUMENTS

| | | | |
|---|---|---|---|
| 2,268,133 A | 12/1941 | Carlson .......................... 161/1 |
| 3,147,001 A | 9/1964 | Purdy ............................. 268/59 |
| 3,262,105 A | 7/1966 | Bell ............................... 340/203 |
| 3,654,480 A | 4/1972 | Stephenson ............... 250/231 R |
| 4,565,029 A | 1/1986 | Kornbrekke et al. ............ 49/25 |
| 4,638,433 A | * 1/1987 | Schindler ..................... 364/400 |
| 4,888,531 A | 12/1989 | Hörmann ..................... 318/282 |
| 4,922,168 A | 5/1990 | Waggamon et al. ......... 318/286 |
| 5,233,185 A | 8/1993 | Whitaker .................. 250/222.1 |
| 5,235,494 A | 8/1993 | Chang et al. ................. 361/736 |
| 5,384,495 A | 1/1995 | Waggamon et al. ......... 307/326 |

FOREIGN PATENT DOCUMENTS

| | | | |
|---|---|---|---|
| DE | 297 06 251 U1 | 10/1997 | ........... G08C/17/00 |
| EP | EP 0 280 854 A1 | 2/1987 | ........... E05F/15/16 |
| EP | 0 280 854 A1 | 9/1988 | ........... E05F/15/16 |
| EP | 0 544 262 A2 | 6/1993 | ........... E05F/15/00 |
| EP | 0 767 288 A1 | 4/1997 | ........... E05F/15/20 |
| EP | 0 771 923 A2 | 5/1997 | ........... E05F/15/00 |
| EP | 0 786 848 A1 | 7/1997 | ........... H02H/7/085 |
| WO | WO 90/10776 | 9/1990 | ........... E05F/15/20 |

* cited by examiner

Primary Examiner—David S. Martin
(74) Attorney, Agent, or Firm—Fitch, Even, Tabin & Flannery

(57) ABSTRACT

An operator for opening and closing movable barriers such as garage doors comprising a pass point limit system which is a component of an operating head. The operator is responsive to remote control from a wall panel or other location remote from the operating head to enable setting and adjustment of door travel limits from a remote location, without requiring installation of limit switches separate from the operating head.

40 Claims, 17 Drawing Sheets

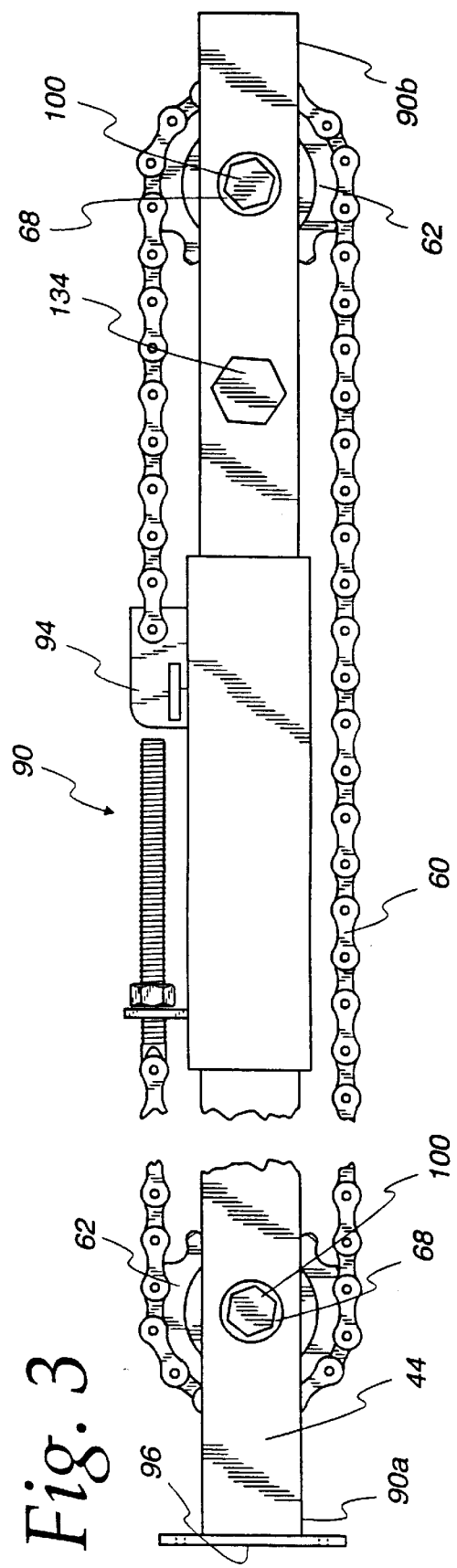
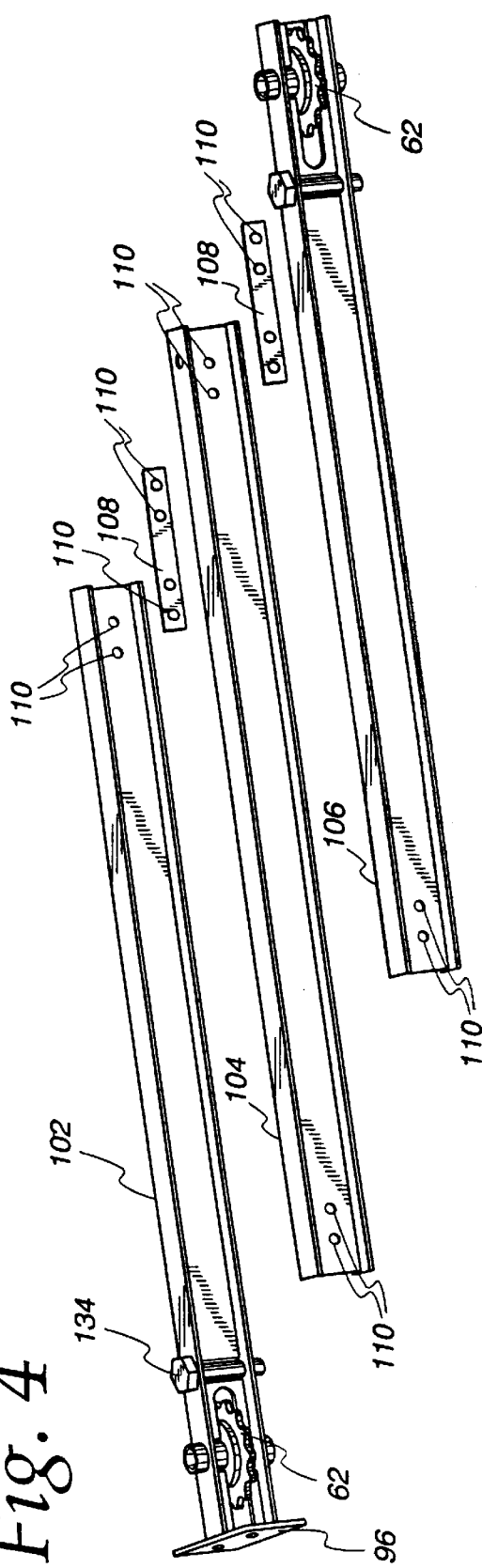

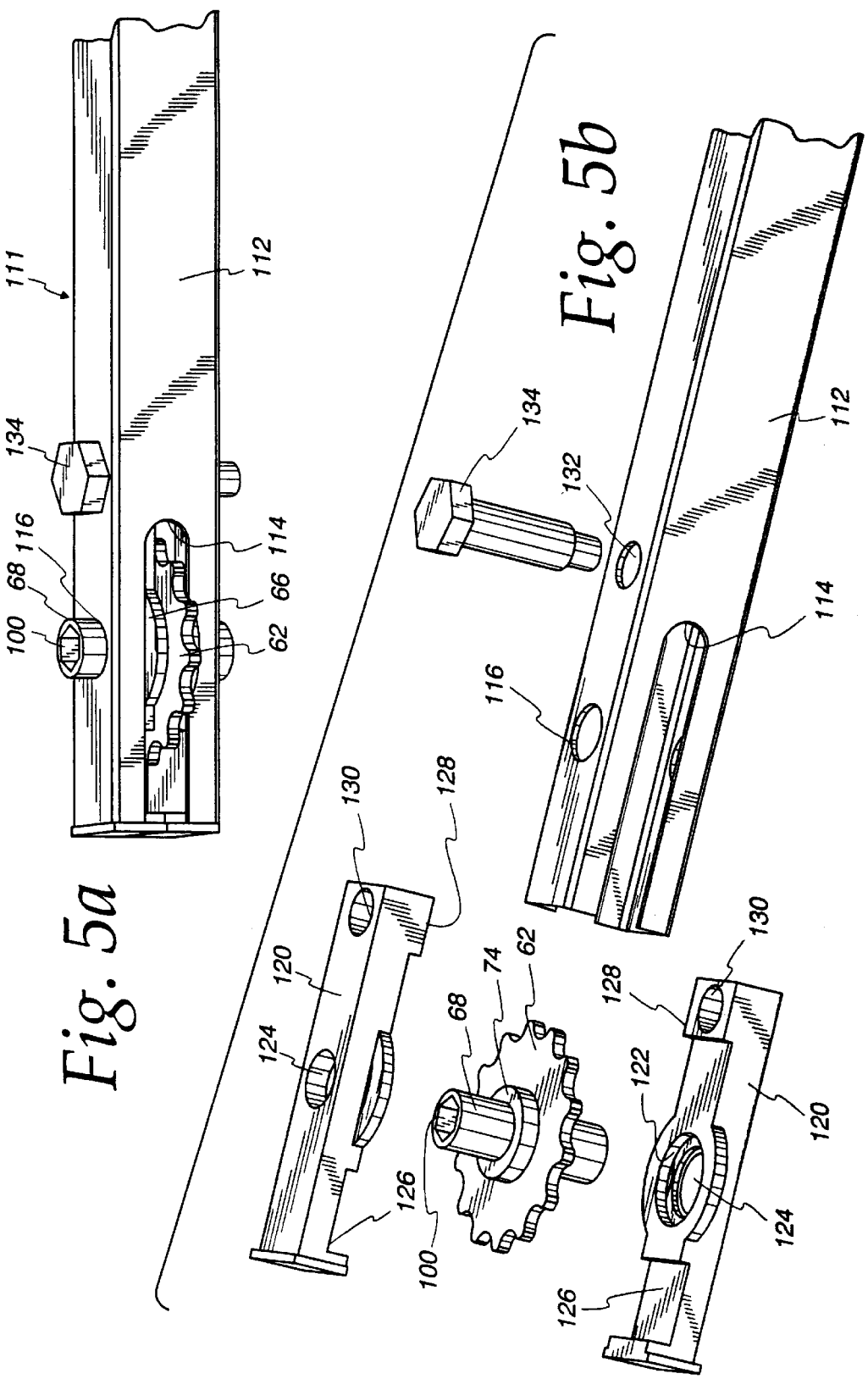

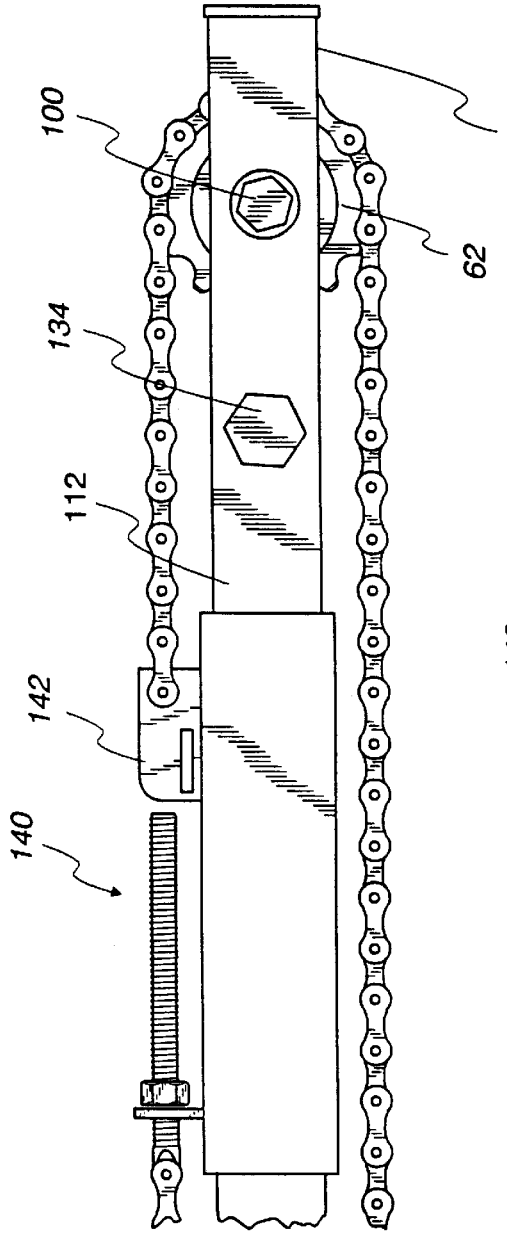
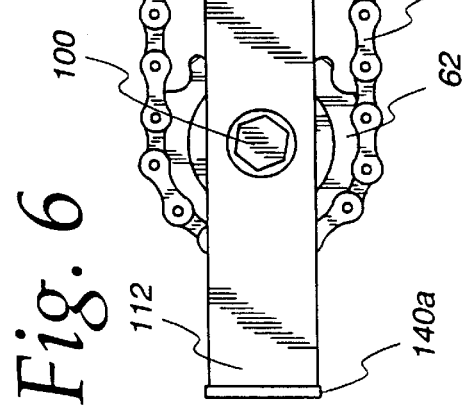
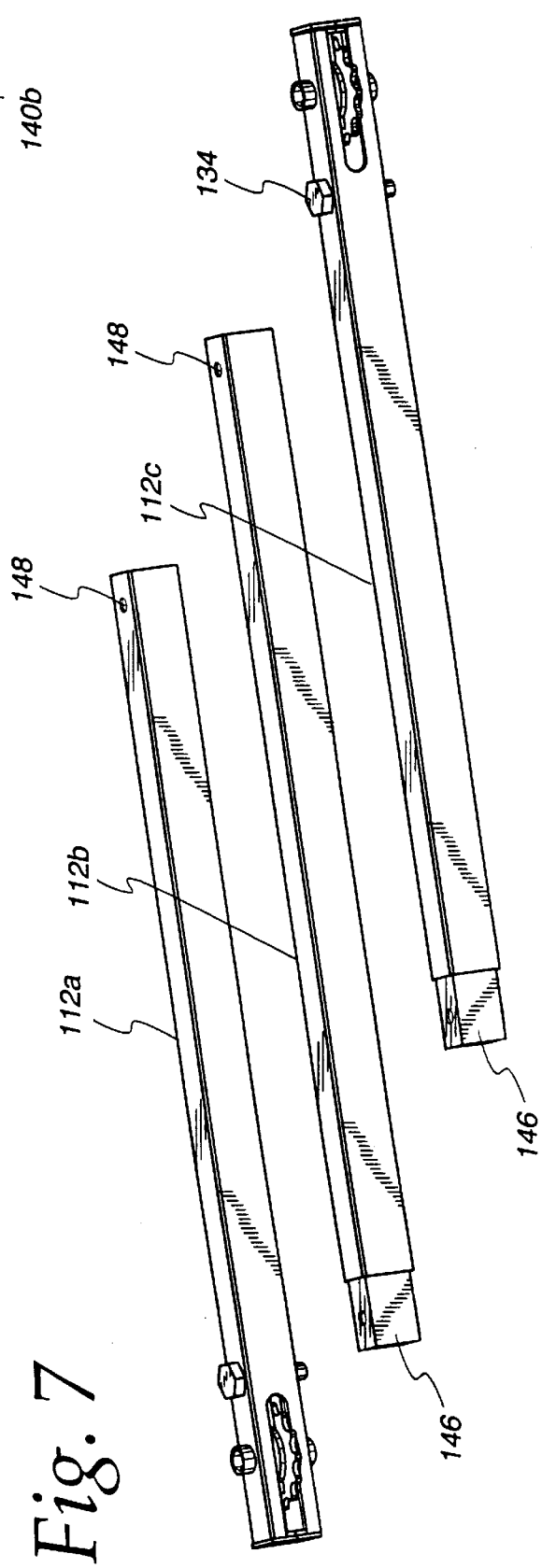

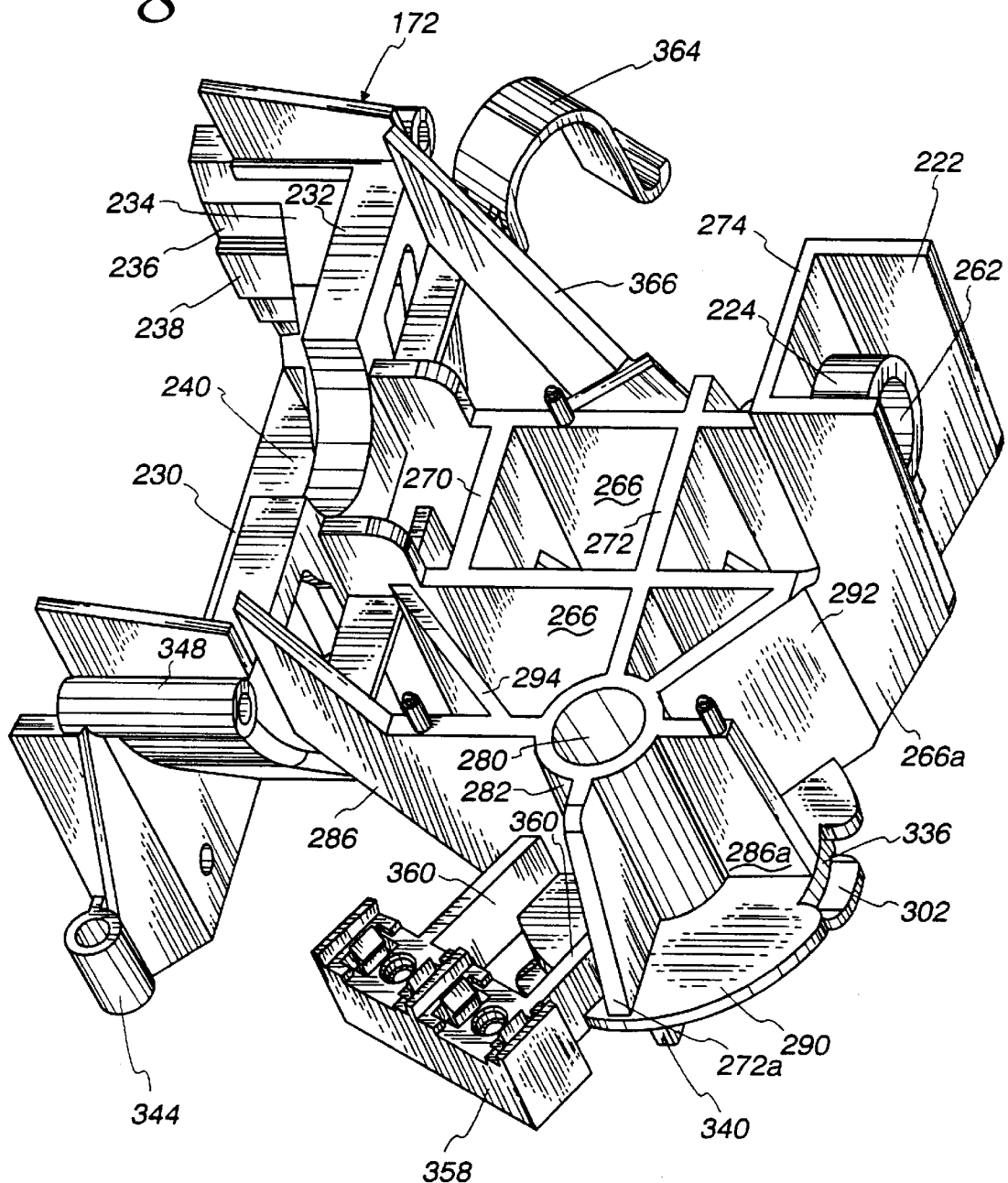

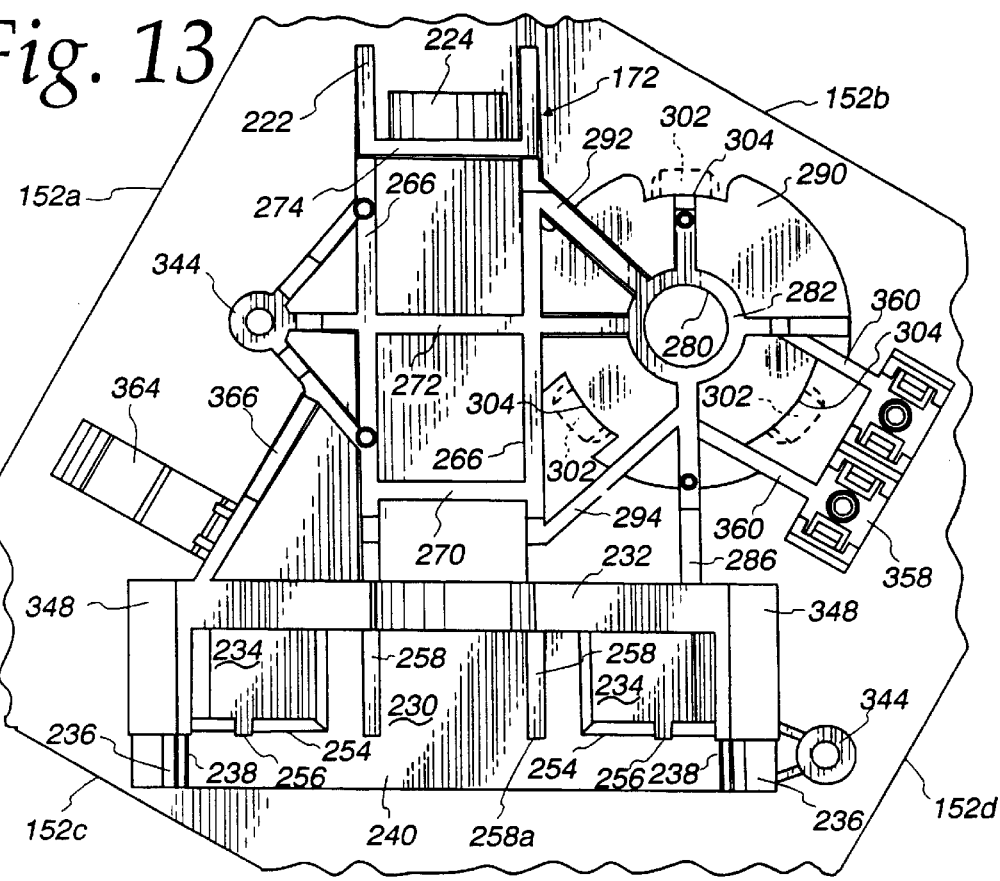
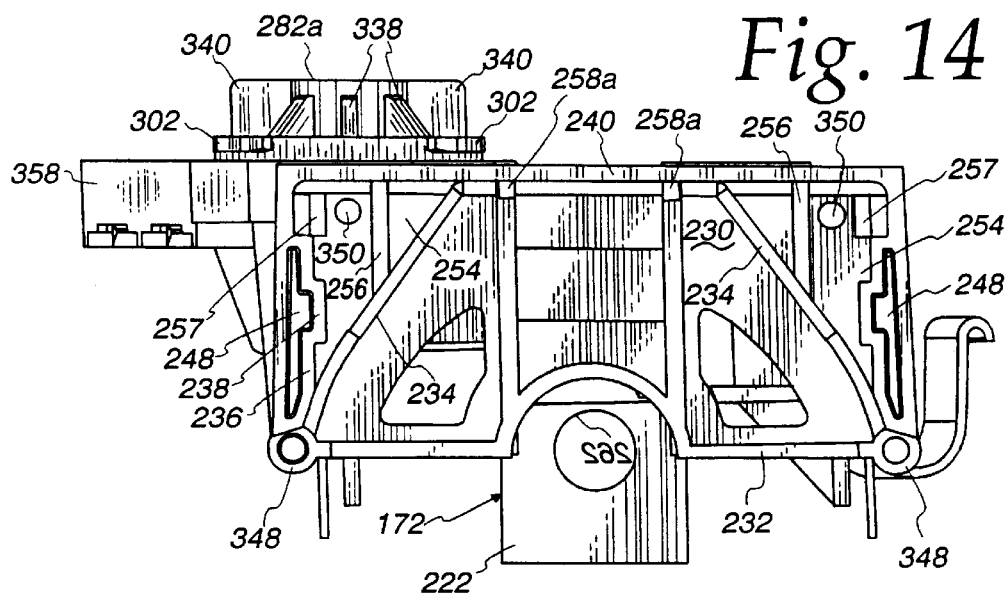

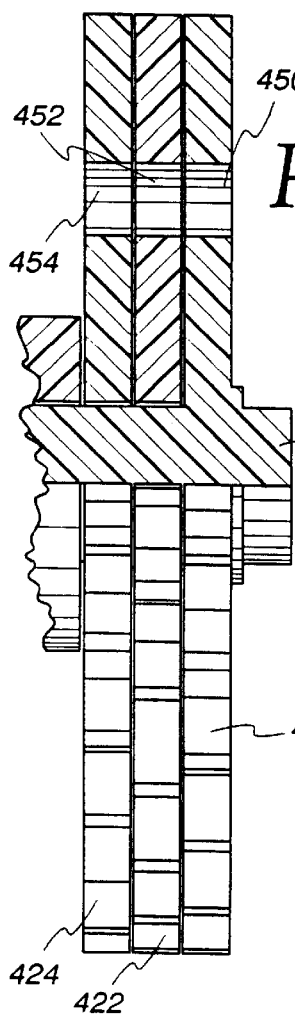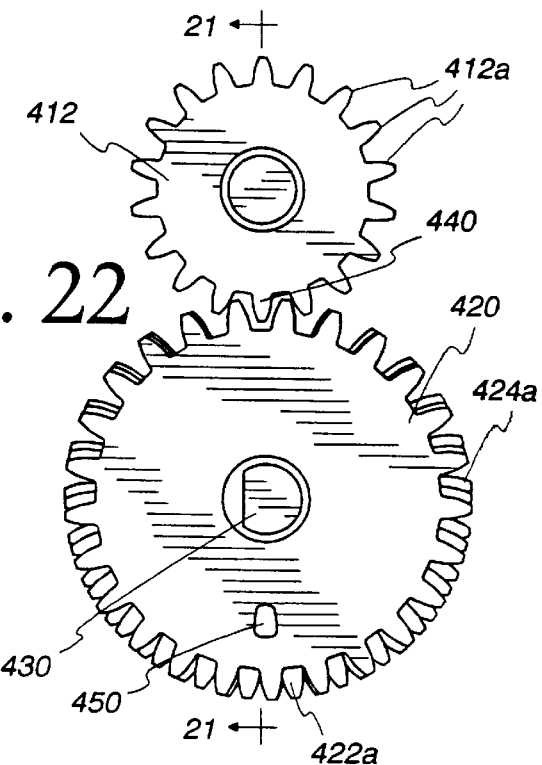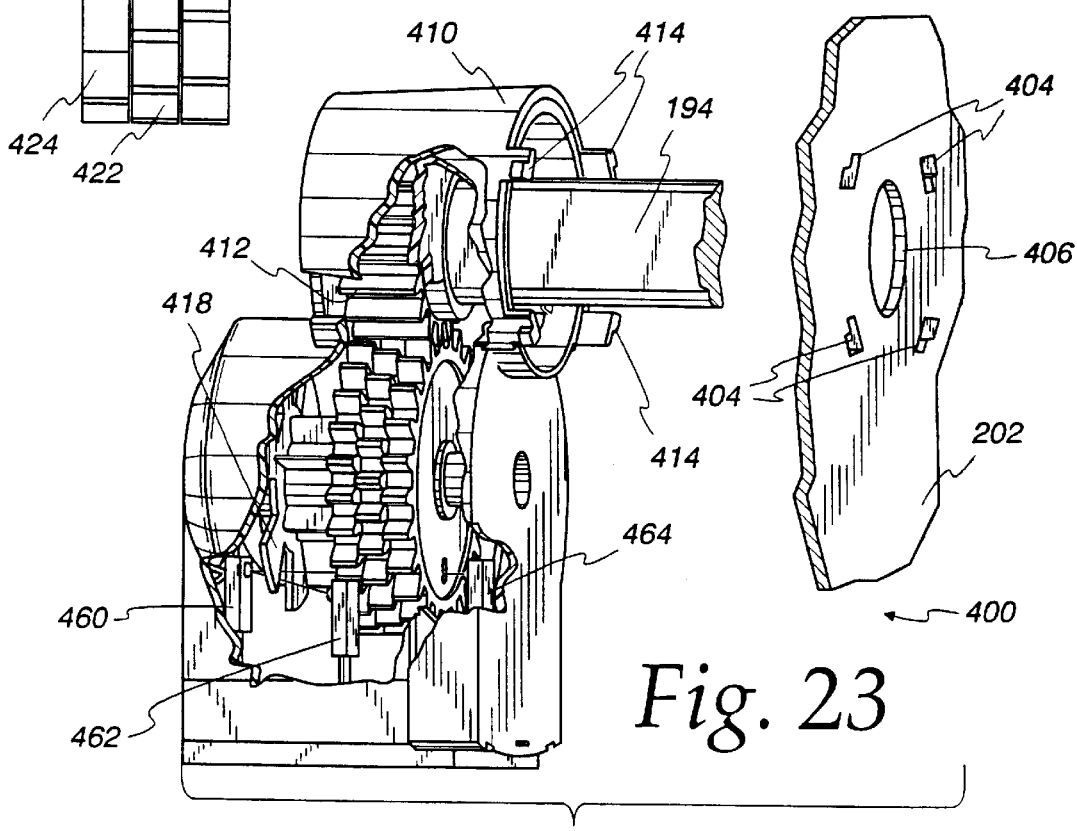
Fig. 21
Fig. 22
Fig. 23

PASS POINT SYSTEM FOR CONTROLLING THE OPERATION OF MOVABLE BARRIERS

This is a continuation, of prior application Ser. No. 09/041,351, filed Mar. 12, 1998, now U.S. Pat. No. 6,051, 947 which is hereby incorporated herein by reference in its entirety.

BACKGROUND OF THE INVENTION

1. Field of the Invention

The invention relates to movable barriers such as overhead doors and the like, particularly openers of the type in which a drive force is applied to the overhead door by a motor assembly.

2. Description of Related Art

One of the problems which must be addressed in designing and engineering overhead door openers for garage doors and other large, heavy doors is the provision of automatic, safe, and reliable stopping of the door at open and closed positions. Most garage door operators include a head unit containing a motor and a transmission, which may comprise a chain drive or a screw drive coupled to a garage door for opening and closing the garage door. As discussed in co-pending U.S. patent application Ser. No. 467,039, which is incorporated herein by reference, such garage door openers also have included optical detection systems located near the bottom of the travel of the door to prevent the door from closing on objects or on persons that may be in the path of the door.

Such garage door operators typically include a wall control which is connected via one or more wires to an operator or head unit to send signals to the head unit from a remote location to cause the head unit to open and close the garage door, and to light a work-light. Such prior art garage door operators also include a receiver for receiving radio frequency transmissions from a hand-held code transmitter or from a keypad transmitter which may be affixed to the outside of the garage or other structure. These garage door operators typically include adjustable limit switches which cause the garage door to reverse direction or which halt the motor when the travel of the door causes the limit switch to change state, either in the open position or in the closed position. In the prior art, internal limit switches have been provided within the head unit, and external limit switches have been provided at various locations outside of the head unit. It may be appreciated that the limits of travel typically must be custom set during or after installation of the unit within the garage. In the past, such units have had mechanically adjustable limit switches which are typically set by an installer. The installer may need to inspect the door, the wall switch and the head unit in order to make adjustments in order to set the limit switches properly. This, of course, is time consuming and results in the installer being required to spend more time than is desirable to install the garage door operator.

Requirements from Underwriters' Laboratories, the Consumer Product Safety Commission, and/or other organizations require that garage door operators sold in the United States must, when in a closing mode and contacting an obstruction having a height of more than one inch, reverse and open the door. Prior art garage door operators also include systems whereby the force which the electric motor applied to the garage door through the transmission might be adjusted. Typically, this force is adjusted by a licensed repair technician or installer who obtains access to the inside of the head unit and adjusts a pair of potentiometers, one of which sets the maximum force to be applied during the closing portion of door operation, the other of which establishes the maximum force to be applied during the opening of door operation.

Such a garage door operator is exemplified by an operator taught in U.S. Pat. No. 4,638,443 to Schindler. However, such door operators are relatively inconvenient to install and invite misuse because the homeowner, using such a garage door operator, if the garage door operator begins to bind or jam in the tracks, may obtain access to the head unit and increase the force limit. Increasing the maximum force may allow the door to move past a binding point, but also may undesirably apply increased force at the bottom of its travel.

Electrical limit switches are operated by physical contact between actuators and stops. However, the mechanical features of the switches and their electrical contacts are subject to strain, degradation caused by exposure to the surrounding environment, and other factors. As a result, the limit switch set points may drift from their proper settings, and, under automatic operation, the overhead door may not close or open as desired. One particular problem can arise when a homeowner, using a remote control unit, transmits a "close" command while driving away from a garage, but the garage door erroneously reverses automatically as it reaches the closed position. In this situation, the garage door may be left open for an extended time, unknown to the homeowner, permitting access to the garage and possibly an attached residence as well. In order to readjust limit switch set points in prior art systems having internal limit switches, a user may be required to inspect the actuators from the vantage point of a ladder and, after determining the direction and amount of adjustment required, physically change their positions.

Commonly assigned U.S. patent application Ser. No. 467,039 discloses an improved control arrangement for garage door operators and the like which addresses several of the above problems. However, there is a continuing need for further improvement, particularly with respect to facilitating installation of a commercially practical apparatus addressing these problems.

SUMMARY OF THE INVENTION

The invention provides an improved door operator for opening and closing overhead doors or other large, heavy barriers which enables one or both of the door travel end points to be set and/or adjusted from a wall-mounted keypad or other easily accessible location remote from the head unit, wherein door travel is measured indirectly by a component of the head, so that installation of limit switches along the path of the door travel may be eliminated, thereby facilitating installation of the door operator. Indirect measurement of door travel may be provided by a compact, internal pass point system driven directly by the motor shaft.

In a preferred embodiment described below, an optical pass point system is mounted on one end of the motor, opposite the transmission. The optical pass point system employs a plurality of spur gears disposed side by side on a common shaft. Each spur gear has a single aperture for transmission of an optical signal. The spur gears have varying number of teeth, and are driven by a common pinion at slightly different speeds to provide a precise, reliable pass point which is detected when all of the apertures align, and which may be used as a reference point for measure of door travel or for other automatic control parameters. The preferred embodiment of the invention incorporates features which substantially eliminate or reduce drift of door travel set points to address the problem of inadvertent automatic reversal of the door. Additional advantages and features of the invention may be appreciated from the written description set forth below and accompanying drawings.

BRIEF DESCRIPTION OF THE DRAWINGS

FIG. 3 is a fragmentary top elevational view thereof;

FIG. 4 is an exploded perspective view of a rail drive assembly in accordance with a second embodiment of the invention;

FIG. 5a is a perspective view of one end of an integrated drive rail in accordance with a third embodiment of the invention;

FIG. 5b is a fragmentary exploded view thereof;

FIG. 6 is a foreshortened top elevational view thereof;

FIG. 7 is an exploded perspective view of an alternative rail drive assembly in accordance with a fourth embodiment of the invention;

FIG. 12 is a perspective view of an integrated housing shown in FIG. 9;

FIG. 13 is a fragmentary bottom view showing the integrated housing mounted in the power drive unit;

FIG. 14 is a rear elevational view of the integrated housing;

FIG. 21 is a fragmentary top plan view of the timing gears;

FIG. 22 is an end elevational view of the arrangement of FIG. 18;

FIG. 23 is a perspective view shown partly broken away of another pass point mechanism.

DETAILED DESCRIPTION OF PREFERRED EMBODIMENT

Figure 1:
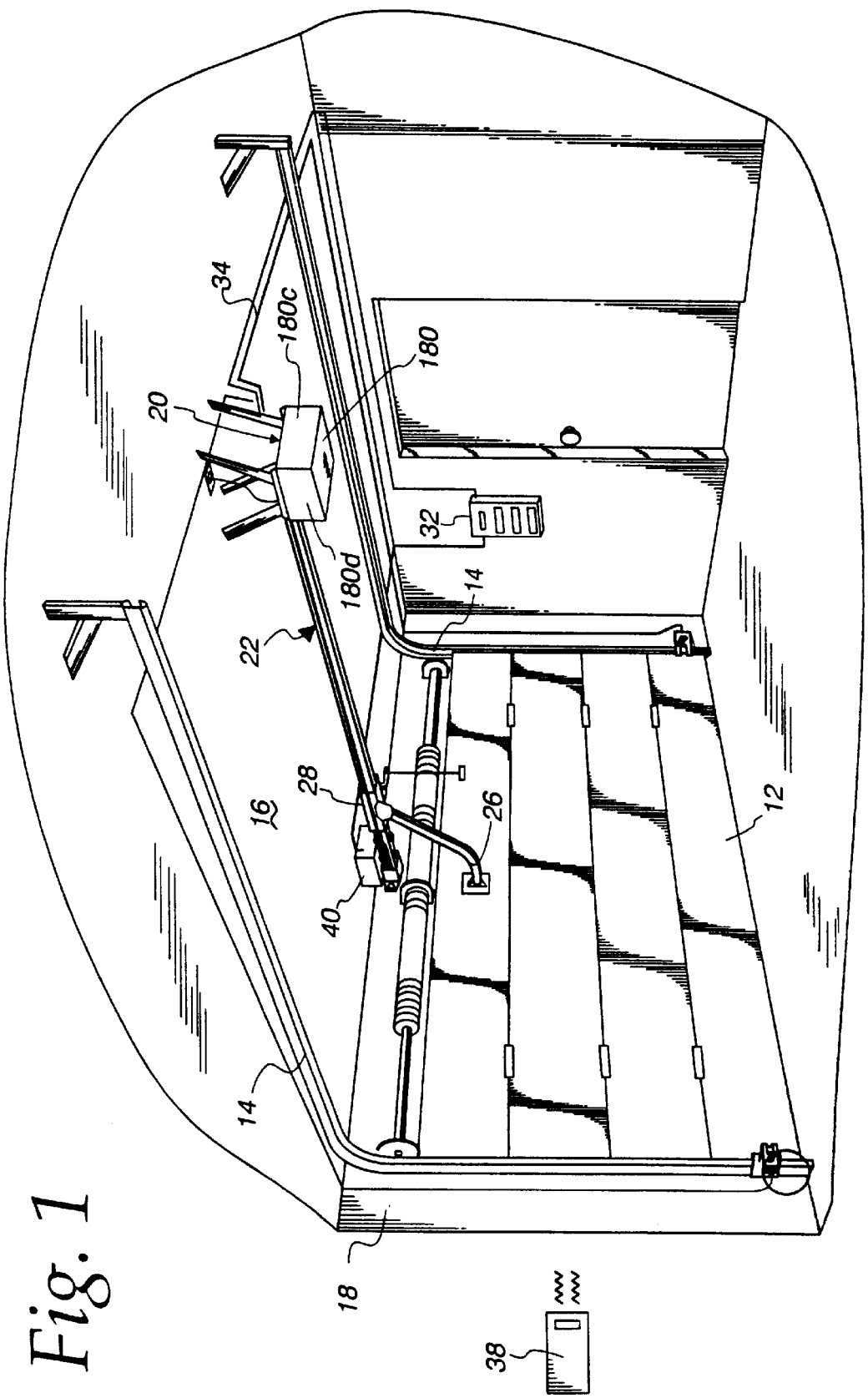
FIG. 1 is a perspective view of a garage door operating system in accordance with an embodiment of the invention.

Referring now to the drawings, and initially to FIG. 1, an operator system for movable barriers is employed for controlling the opening and closing of a conventional overhead garage door 12. The garage door 12 is mounted on guide rails 14 for movement between the closed position illustrated in FIG. 1 and an open or raised position. The garage includes a ceiling 16 and a wall 18 defining an opening blocked by garage door 12. As shown, guide rails 14 are mounted to wall 18 and ceiling 16 of the garage in a conventional manner.

A power drive unit or head, generally indicated at 20, is mounted to ceiling 16 in a conventional manner. An integrated drive rail 22 extends between power drive unit 20 and wall 18. As can be seen in FIG. 1, one end of integrated drive rail 22 is mounted to a portion of wall 18 located above door 12. An operator arm 26 is connected at one end to door 12 and at the other end to a trolley 94 mounted for movement back and forth, along integrated drive rail 22. As will be seen herein, a motor in power drive unit 20 propels trolley 94 in a desired manner to raise and lower garage door 12 via the coupling of trolley 94 and arm 26 to garage door 12.

A push button control unit 32 which includes an electronic controller and a keypad is coupled by conductors 34 to power drive unit 20 and sends signals to the power drive unit, controlling operation of the drive motor therein. Preferably, power drive unit 20 also includes a conventional radio receiver (not shown) for receiving radio signals from a remote control transmitter 38. An optional auxiliary power drive unit 40 is shown coupled to one end of integrated drive rail 22, being mounted on wall 18, atop door 12. If desired, operational flexibility of the integrated drive rail assembly may allow relocation of the main drive unit to a point adjacent the door.

Integrated Rail Drive Assembly

Figure 2A:
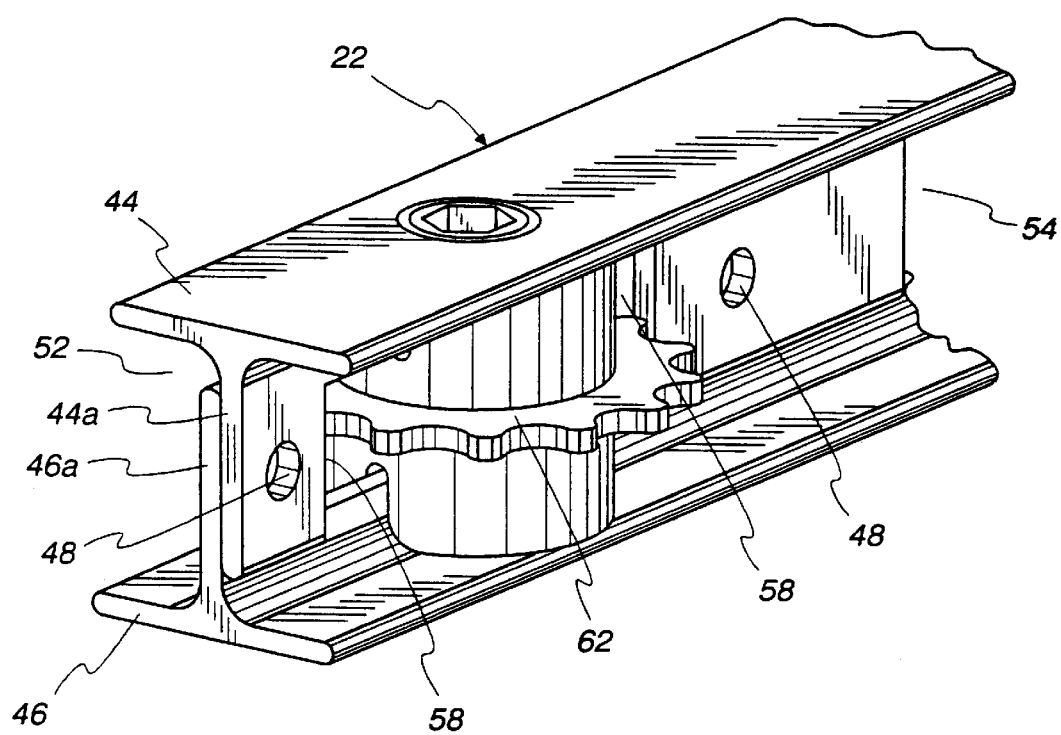
FIG. 2a is a fragmentary perspective view of an integrated drive rail of the system of FIG. 1.

Turning now to FIGS. 2 and 3, integrated drive rail 22 has a generally I-shaped cross section preferably formed by the combination of two T-shaped rail members 44, 46 having overlying web portions 44a, 46a, rigidly joined together by a series of fasteners, preferably bolt fasteners, passing through aligned apertures formed in the webs 44a, 46a. As can be seen in FIG. 2, the overall construction of integrated drive rail 22 provides longitudinal recesses or cavities 52, 54 on either side of the webs 44a, 46a. A linear flexible drive member, such as a conventional chain 60 shown in FIG. 6, passes through aligned openings 58 formed in the webs 44a, 46a so as to wrap around a sprocket member 62, with portions of the chain running adjacent the recesses 52, 54. Preferably, and as shown in FIG. 3, both ends of integrated drive rail 22 are of similar construction, with the sprockets 62 preferably being dimensioned slightly larger than the width of flanges 44, 46 so that the straight path portions of drive chain 60 lie just outside the recesses 52, 54. If desired, a guard, such as guard 159 shown in FIG. 8, can be installed at one or both ends of the integrated drive rail assembly 90.

Figure 2B:
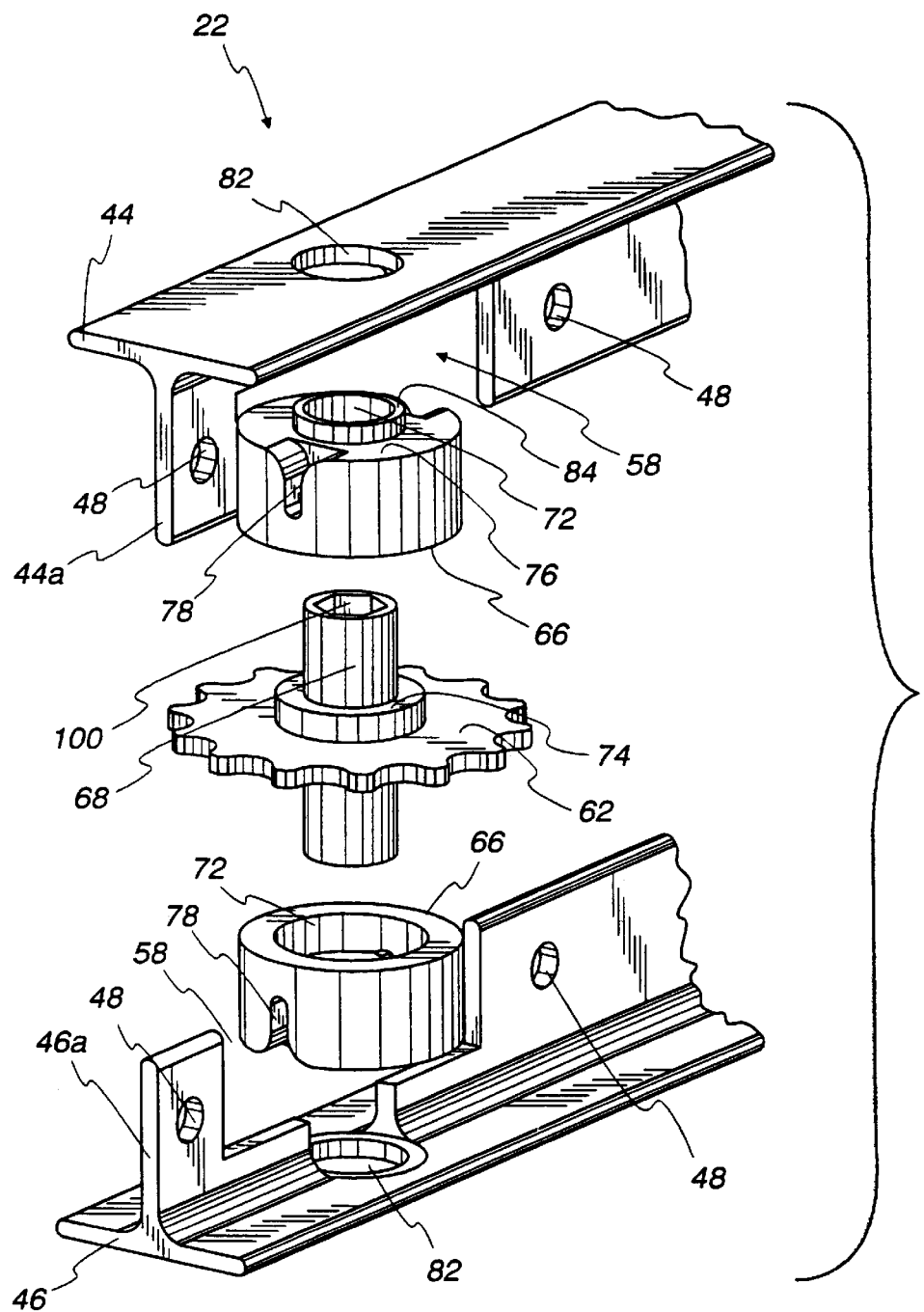
FIG. 2b is a fragmentary exploded view thereof.

Referring now to FIG. 2b, sprocket 62 is rotatably mounted and held captive within the integrated drive rail 22 by bushing-like mounting members 66 which are received in the openings 58 formed in the webs of each T-rail portion. A rotary support shaft 68 extends through the central axis of sprocket 62 and is affixed thereto by suitable means. The shaft 68 is received in central bores 72 formed in mounting member 66. In the preferred embodiment, discs 74 are affixed to shaft 68 and received in enlarged portions of bore 72 to provide improved stabilization and alignment of shaft 68 as the shaft is rotated within mounting member 66. As can be seen in FIG. 2b, the end faces 76 of mounting member 66 define recesses 78 which receive portions of the rail web members to prevent the mounting members from turning within openings 58. The rail members 44, 46 define openings 82 for receiving collar-like end portions 84 of mounting members 66. End portions 84 provide added alignment and bearing surfaces for the outer surfaces of shaft 68 and protect the shaft against contact with the internal walls of holes 82, so as to eliminate the need for machining those walls.

In overhead door installations, the integrated drive rail may be slightly longer than the height of the garage door. When the garage door is open, the integrated drive rail extends along the open door and it is desirable to provide extra length for the integrated drive rail to allow a drive chassis connected to the integrated drive rail to be spaced from the opened garage door. It has been found generally desirable heretofore, for convenience in shipping and packaging, to ship the drive rail in several sections which are fitted together at the installation site. However, in some embodiments of the invention, e.g., in operators for commercial, rather than residential uses, an integrated, pre-assembled, full length rail may be employed with a pre-assembled and pre-adjusted chain/rail assembly of the type illustrated in FIGS. 3 and 6, for example.

In FIG. 3, an integrated rail drive assembly is generally indicated at 90. The integrated rail drive assembly includes a single continuous integrated drive rail 22 of full length required for a given installation. For example, when employed in the arrangement shown in FIG. 1, a single-piece integrated drive rail 22 extends from the garage wall 18 above the door to the power drive unit. The shaft 68, sprockets 62 and their related components, along with chain 60 and conventional trolley 94, are mounted to the drive rail, with the chain 60 (or other type of linear drive element) pre-tensioned and adjusted at the manufacturer's premises, before shipping to an installation site. Accordingly, the integrated rail drive assembly 90 may be purchased and delivered as a complete unit to an installation site, providing substantial savings in installation time and cost.

In the arrangement shown in FIG. 3, an optional end cap or mounting bracket 96 has been provided for mounting a first end 90a of the integrated drive rail assembly 90 to the garage wall 18 shown in FIG. 1. However, virtually any conventional arrangement for mounting the integrated drive rail to the garage wall can be employed. The opposite end 90b is bolted or otherwise attached to the power drive unit 20. As can be observed in FIG. 2b, shaft 68 is provided with a non-cylindrical, preferably a generally hexagonal cross-sectional configuration. As will be seen below, a slip fit connection of the non-cylindrical central bore 100 with the drive shaft of the power drive unit is possible and results in substantial savings in the time required for installation and set-up.

As can be seen in FIG. 3, the chain 60 is formed in a closed loop, being supported by sprockets 62 located at each end of the drive rail. One end 90b of the drive rail assembly is engaged with power drive unit 20, as described above. As mentioned above, an auxiliary drive unit 40 can be engaged with the opposite end of the drive rail assembly (that is, with reference to FIGS. 1 and 3, the auxiliary power drive 40 can be coupled with the central bore 100 of sprocket 62 adjacent end 90a of integrated rail drive assembly 90). The optional power drive unit 40 can comprise, for example, a battery operated motor for operation under power outage conditions or a spring assist.

Referring now to FIG. 4, there is shown an embodiment adapted for application where it is inconvenient to ship the drive rail as a single full length component, e.g., for retail sale to consumers who may wish to transport the operator in the trunk of an automobile in kit form, for subsequent assembly on site. In FIG. 4, the drive rail is divided in three sections, 102, 104 and 106. Each section 102, 104 and 106 may be made in the manner illustrated in FIG. 2b, i.e. comprising of a joinder of interfitting rails of T-shaped cross section. Conventional means such as joining plates 108 or other connectors may be provided for assembling the rail sections in end-to-end fashion with bolt fasteners or the like (not shown) passing through aligned holes 110 formed in the adjoining plates and rail sections. Alternatively, each of the sections may comprise an integral, unitary rail of I-shaped cross section. If desired, rails of different cross section can be substituted for the arrangement shown in FIGS. 2–4.

After assembly of the rail sections 102, 104 and 106, the trolley 94 illustrated in FIG. 3 (or another trolley) and a linear flexible drive member, such as the chain 60 shown in FIG. 3, is mounted to drive the trolley back and forth along the length of the joined rail sections. The chain is wrapped about the sprockets 62 with the ends of the chain being connected to the trolley. If desired, cables, belts or other flexible linear drive elements can be combined with or employed in place of chain 60.

Referring now to FIGS. 5a and 5b, one end of an alternative integrated drive rail is indicated at 111. Integrated drive rail 111 includes a hollow tubular body 112, which may be of a generally square or other rectangular cross-sectional shape. Body 112 includes slots 114 and holes 116 as can be seen in FIG. 5b. Sprocket 62, disc 74 and shaft 68 are as described above in FIG. 2b. In place of the cylindrical mounting member 66 described above, elongated bushings or mounting members 120 dimensioned for telescopic insertion within the hollow interior of body 112 are provided.

Mounting members 120 include stepped recessed portions 122 for receiving the disc member 74 and holes 124 for receiving the ends of shaft 68. A recess 126 is provided for added clearance for a chain which is later wrapped around sprocket 62, during assembly at an installation site. Raised land portions 128 are dimensioned to engage one another when the mounting members and sprockets are inserted in the hollow interior of body 112 and tightened. In the preferred embodiment, holes 130 extending to the land portions 128 and hole 132 in body 112 are provided to receive a threaded fastener 134. Fastener 134 draws the mounting members 120 together and provides an interference fit within holes 130, 132 to prevent shifting of the housing members and sprocket once installed within hollow body member 112. A nut fastener (not shown) can be mated to fastener 134 or, as will be seen below, fastener 134 can be screwed into a threaded bore in a power drive unit coupled to the integrated drive rail.

Turning now to FIG. 6, an integrated rail drive assembly is generally indicated at 140 and includes integrated drive rail 111 having a full length dimension so as to extend between wall 18 and power drive unit 20 shown in FIG. 1. The sprocket arrangement shown in FIG. 5b is provided at each end of tubular body 112 and chain 60 is wrapped about sprockets 62 and secured to a trolley 142. Trolley 142 has a hollow cross section for receiving tubular body 112 so as to slide therealong in captive engagement therewith. In the preferred embodiment, the chain 60 is installed, pre-tensioned and adjusted by the manufacturer, prior to shipping to an installation site. Upon arrival at the installation site, a conventional mounting arrangement, such as a socket dimensioned to receive the free end 140a of assembly 140, and with outlying ears to receive screw fasteners for joining to garage wall 18 shown in FIG. 1, is employed to mount the rail to the garage wall. The remaining free end 140b is adapted for fitting to power drive unit 20 as will be explained with reference to FIG. 8.

Turning now to FIG. 7, tubular body 112 may, if required, be divided into a number of smaller size segments, such as the segments 112a–112c shown in FIG. 7. Socket portions 146 provide telescopic interfitting connection of the sections 112a–112c and holes 148 formed in the sections receive screw fasteners to further secure the body sections together.

By having the drive reil assembly completely self-unitized, the linear drive element can be driven from a variety of different positions. If desired, the drive motor can be mounted transverse to the drive rail assembly, thereby providing advantages where space requirements dictate an arrangement of this type. Also, the drive motor could be directly mounted to the rail rather than to the chassis.

In the past, many overhead door openers have employed an arrangement in which the drive sprocket or pulley is cantilevered at the end of a drive shaft extending from the chassis of the drive unit or head, resulting in significant bending moments on the drive shaft and chassis in reaction to tension in the flexible linear drive member. The integrated rail arrangement described above addresses this problem by reducing or substantially eliminating transverse loads on the drive shaft. The transverse loads are borne by bushings or bearings on the drive rail which support the sprocket engaged by the drive shaft against transverse displacement. Tension in the flexible linear drive member is resolved in the integrated rail structure, rather than resulting in bending moments on the chassis.

Another advantage associated with the integrated rail is that it may enable a lower profile to be provided. In the past, it has been found advantageous to position the drive sprocket near the back end of the drive unit, i.e., near the end opposite the door, to enable the rail, or a bracket for engaging the rail, to be positioned along the top wall of the drive unit, in order to help the drive unit withstand the bending moments resulting from tension in the chain, belt, and/or cable. With the integrated rail, however, the drive sprocket may be positioned near the front of the drive unit, and an opening may be provided in the drive unit behind the drive sprocket to allow the motor to protrude upward through the top wall of the drive unit, thereby enabling the overall height of the drive unit to be reduced. The resulting low-profile configuration would facilitate installation in garages having limited head room.

Figure 8:
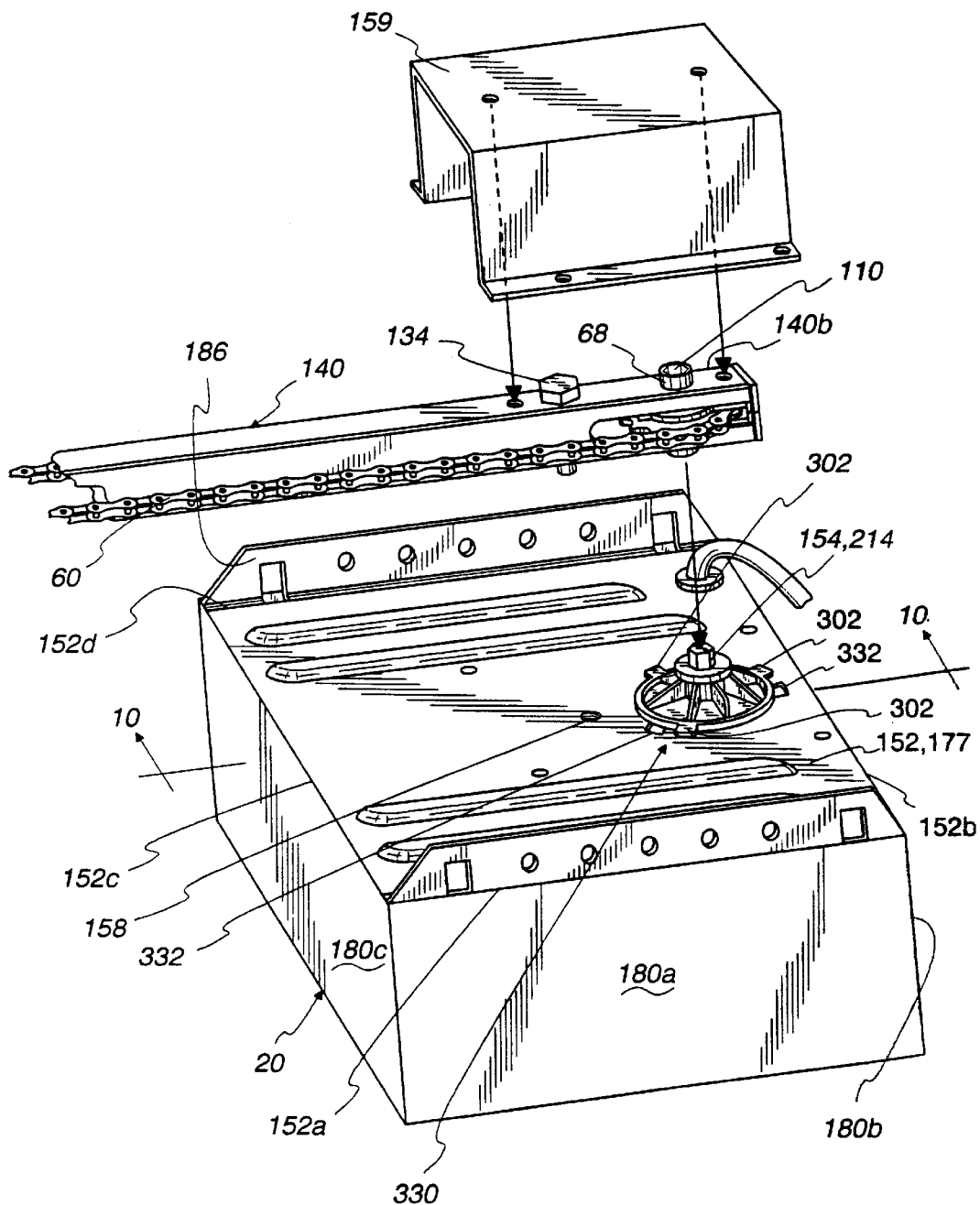
FIG. 8 is a fragmentary perspective view of a rail drive assembly and power drive unit in accordance with an embodiment of the invention.

Turning now to FIG. 8, the free end 140b of rail drive assembly 140 is positioned over power drive unit 20. As will be seen herein, the power drive unit 20 includes a chassis plate 152 on which components are mounted for rotating drive shaft 154. In the preferred embodiment, shaft 154 has a generally hexagonal cross section head 214 dimensioned for insertion within the hexagonal-shaped central bore 100 of sprocket shaft 68 to provide a slip fit connection of shafts 68, 154. To secure the integrated rail drive assembly 140 to power drive unit 20 a threaded aperture 158 is formed in chassis plate 152 to receive the threaded free end of fastener 134. If desired, a guard 159 can be secured to rail 140 and/or to chassis plate 152.

In the embodiment shown in FIG. 8, the bearing structure protrudes upward from the upper surface of the chassis around the upwardly extending shaft 154 so that the rail will be spaced above the chassis. Accordingly, appropriate spacers may be provided around the threaded fastener 134 and/or at other locations between the rail and the top wall of the chassis, in the embodiment of FIG. 8. In other embodiments, the bearing support structure may be eliminated or positioned below the top wall of the chassis so that the rail may be in direct contact with the top wall of the chassis, rather than being spaced therefrom.

In any of these embodiments, the same power head can be employed without modification, to accommodate different types of linear drive elements, such as chain drive, belt drive, and combinations of chain/cable or belt/cable.

Integrated Housing

Figure 9:
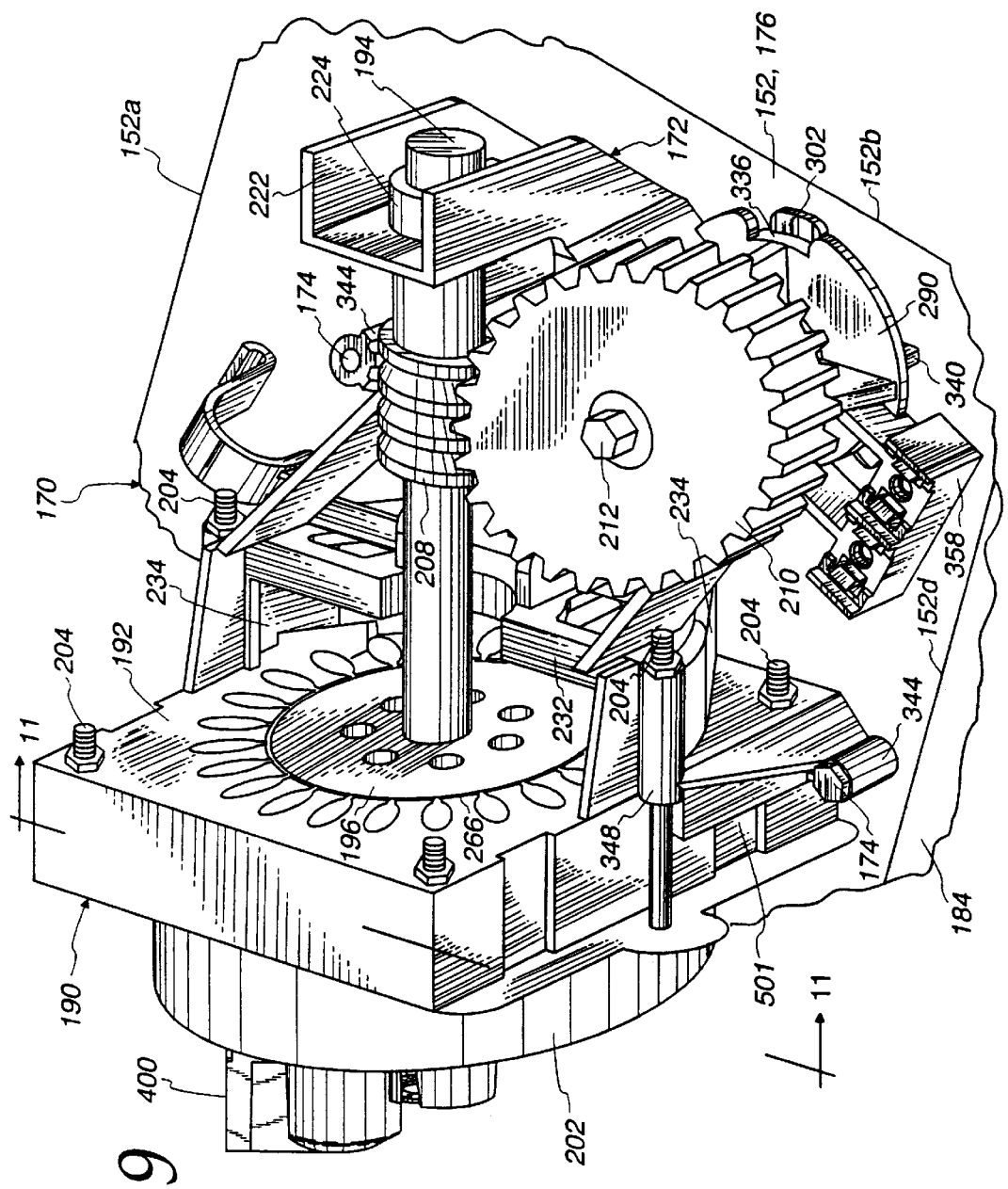
FIG. 9 is a perspective view of components internal to the power drive unit of FIG. 8.

Turning now to FIG. 9, the power drive unit includes a housing assembly generally indicated at 170. Housing assembly 170 includes a one-piece molded plastic housing generally indicated at 172 which is secured by bolt fasteners 174 to the inside surface 176 of chassis plate 152. With additional reference to FIGS. 1 and 8, drive unit 20 includes a cover 180 having side faces 180a–180d (as can be seen in FIGS. 1 and 8). Chassis plate 152 has edges 152a–152d corresponding to the side walls 180a–180d of cover 180, as can be seen, for example, in FIG. 8. Chassis plate 152 includes a pair of opposed edge walls 184, 186 located at edges 152a, 152d, as can be seen in FIG. 8, which shows the exterior face 177 of chassis plate 152. FIG. 9 shows the interior face 176 of chassis plate 152, normally enclosed by cover 180. Edges 152a, 152b and a fourth edge 152d are visible in FIG. 9.

As will be seen herein, the one-piece integrated plastic housing 172 provides improved mounting and global alignment for a number of components, including the electric drive motor generally indicated at 190 and transmission components which deliver power to drive shaft 154. To maintain precise air gap dimensions between the stator and rotor windings of the drive motor, external alignment of the motor components is provided by integrated plastic housing 172. More particularly, the integrated housing 172 provides mounting for a stator component 192 and motor shaft 194 which is an extension of rotor 196. As can be seen in FIG. 9, motor 190 includes a single end bell housing 202 which is joined by a plurality (preferably six) threaded fasteners 204 to integrated housing 172. A worm gear or worm 208 carried on shaft 194 drives a gear or worm wheel 210 mounted on drive shaft 154.

In addition, the same integrated plastic housing also serves as a constraint for the power transmission components delivering motor output power to the linear drive element. For example, integrated housing 172 includes a yoke-like wall member 222 carrying a collar portion 224 for receiving the free end of motor shaft 194. A bearing, such as a sleeve bearing, is preferably carried within the collar 224 to provide a low friction bearing support for the free end of motor shaft 194. The opposite end of motor shaft 194 is supported by a bearing (not shown) located within end bell 202.

Turning now to FIGS. 12–16, at the opposite end of housing 172 from wall 222, a large recess or pocket 230 (see FIGS. 12 and 13) is provided for receiving the upper portion of stator 192 in a snug interference fit. Pocket 230 is defined by locating walls which contact faces of stator 192, orienting the stator in three dimensional space in alignment with torque-transmitting members powered by the motor. The locating surfaces of pocket 230 include ribs 256 and 257 on rear surfaces of triangular walls 234 for engaging the front of the stator, side walls 236 including horizontal ribs 238 which interfit with grooves 501 (FIG. 9) in the stator to provide a tongue-in-groove arrangement, and a top wall 240, spanning the distance between side walls 236 to engage the top of the stator.

Figure 11:
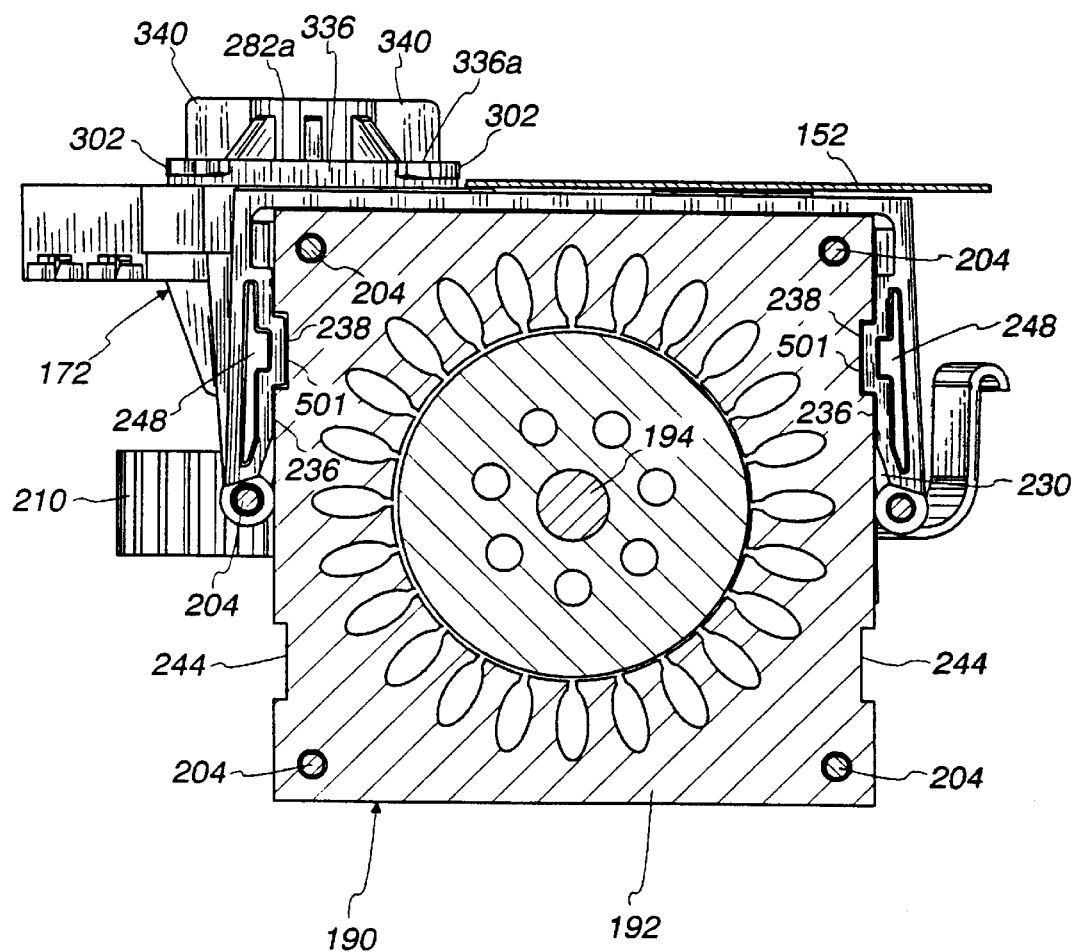
FIG. 11 is a cross-sectional view taken along line 11—11 of FIG. 9.
Figure 15:
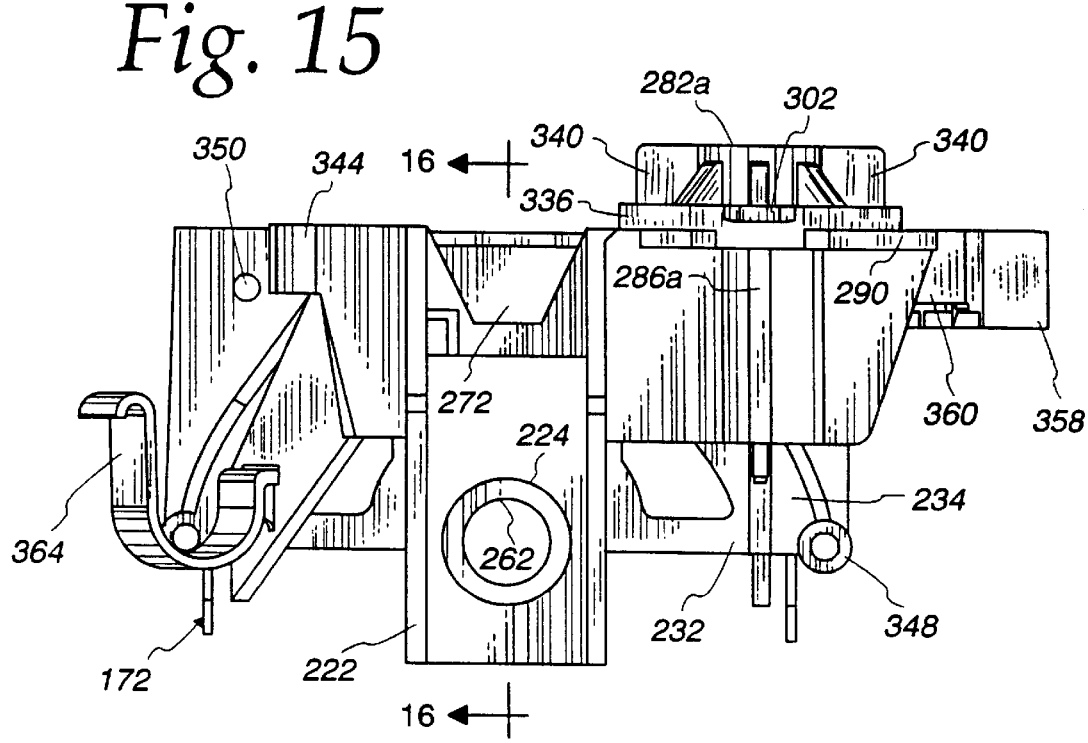
FIG. 15 is a front elevational view of the integrated housing.

As can be seen in FIG. 11, the horizontal ribs 238 protrude inward from the side walls 236 and fit within complementary recesses formed in the stator 192 to function as locators, providing precise positioning of the stator relative to the housing. In the preferred embodiment, the stator 192 is manufactured so as to be mated in one of two positions, with the integrated plastic housing 172. Accordingly, there is provided an extra pair of the complementary-shaped grooves or recesses 244 which are visible in the upper portion of FIG. 11. As can be seen in FIG. 14, the side walls 236 and ribs 238 are molded as an integral unit, with the ribs 238 having hollow interior cavities 248.

Referring again to FIG. 13, ribs 258 are provided on top wall 240 so as to present end faces 258a (see FIG. 14) which also contact the forward face of the stator, cooperating with ribs 256 to accurately orient the stator with respect to the integral housing 172.

Referring additionally to FIG. 9, the forward face of stator 192 is schematically drawn for purposes of illustration. In FIG. 9, the forward face of the stator is terminated approximately flush with the forward face of the rotor 196. However, the triangular walls 234 cooperate with the forward wall 232 to form a pocket to provide clearance for any motor windings which might protrude from stator 192 in a forward direction, beyond the generally flat face of the stator. The surfaces of triangular walls 234 and the rear surface of forward wall 232 are dimensioned so as to be spaced from the stator to avoid interfering with the alignment of the stator, as described above. As noted above, with the absence of a second end bell directly attached or otherwise coupled to stator 192, the integrated housing 172 is relied upon to provide alignment between the stator and rotor components of the motor.

Figure 16:
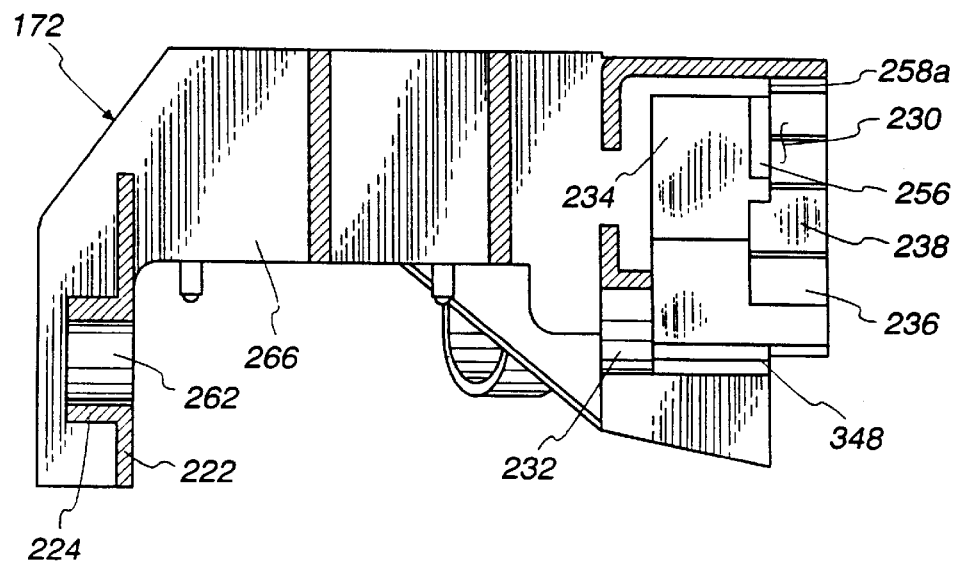
FIG. 16 is a cross-sectional view taken along the line 16—16 of FIG. 15.

With reference to FIGS. 9 and 12–14, collar 224 defines an inner bore 262 which receives the free end of motor shaft 194. With reference to FIG. 14, the same integrated housing 172 defines inner bore 262 as well as locating ribs 256, 258 and cooperating surfaces (i.e., side walls 236, key portions 238 and floor 240) which accurately position the motor stator. Preferably, the alignment of stator and rotor components provided by integrated housing 172 is sufficient to maintain an air gap 266 (see FIG. 9) between rotor and stator components having a maximum gap size of about 10 mils. Referring to FIG. 16, longitudinal wall portions 266 extend from forward wall 232 to collar portion 224. As can be seen, for example, in FIG. 13, walls 266 are intersected by walls 270, 272 and 274 and cooperate therewith to form a rigid structure which is open at the bottom.

Referring to FIG. 9, the integrated housing 172 provides a precise alignment between worm gear 208 and gear 210 so as to maintain an efficient coupling between these components of the power train within close tolerances. As can be seen, for example, in FIGS. 9 and 10, gear 210 has a substantial thickness, which may be, e.g., between about one-third and one-fourth the diameter of the spur gear. Thus, the engagement between the worm gear 208 and gear 210 spans a substantial portion of the outer surface of the spur gear. The alignment between the spur gear and worm gear must be maintained with a sufficient precision to prevent unduly high friction losses, chattering and the like, during operation of a massive overhead door or the like where power levels of, e.g., one-half horsepower or one-third horsepower are being transmitted by the operator. Thus, the integrated housing 172 is relied upon to provide precise positioning of the motor shaft and the transmission shaft 154.

To this end, transmission shaft 154 is received in the internal bore 280 of cylindrical wall 282. In the preferred embodiment, a sleeve bearing (not shown) is received in internal bore 280 for low friction support of spur gear shaft 278. Referring to FIG. 12, cylindrical wall 282 is supported by longitudinal, generally vertical walls 286 and 286a, and transverse, generally vertical walls 272 and 272a. A generally disc-shaped longitudinal wall 290 surrounds the upper end of wall 282. With reference to FIGS. 12 and 13, a generally vertical diagonal wall 292 extends between cylindrical wall 282 and a forward wall portion 266a beyond which a lower forward wall portion 222 extends. A second diagonal wall 294 provides further strength and rigidity to the structure.

Figure 10:
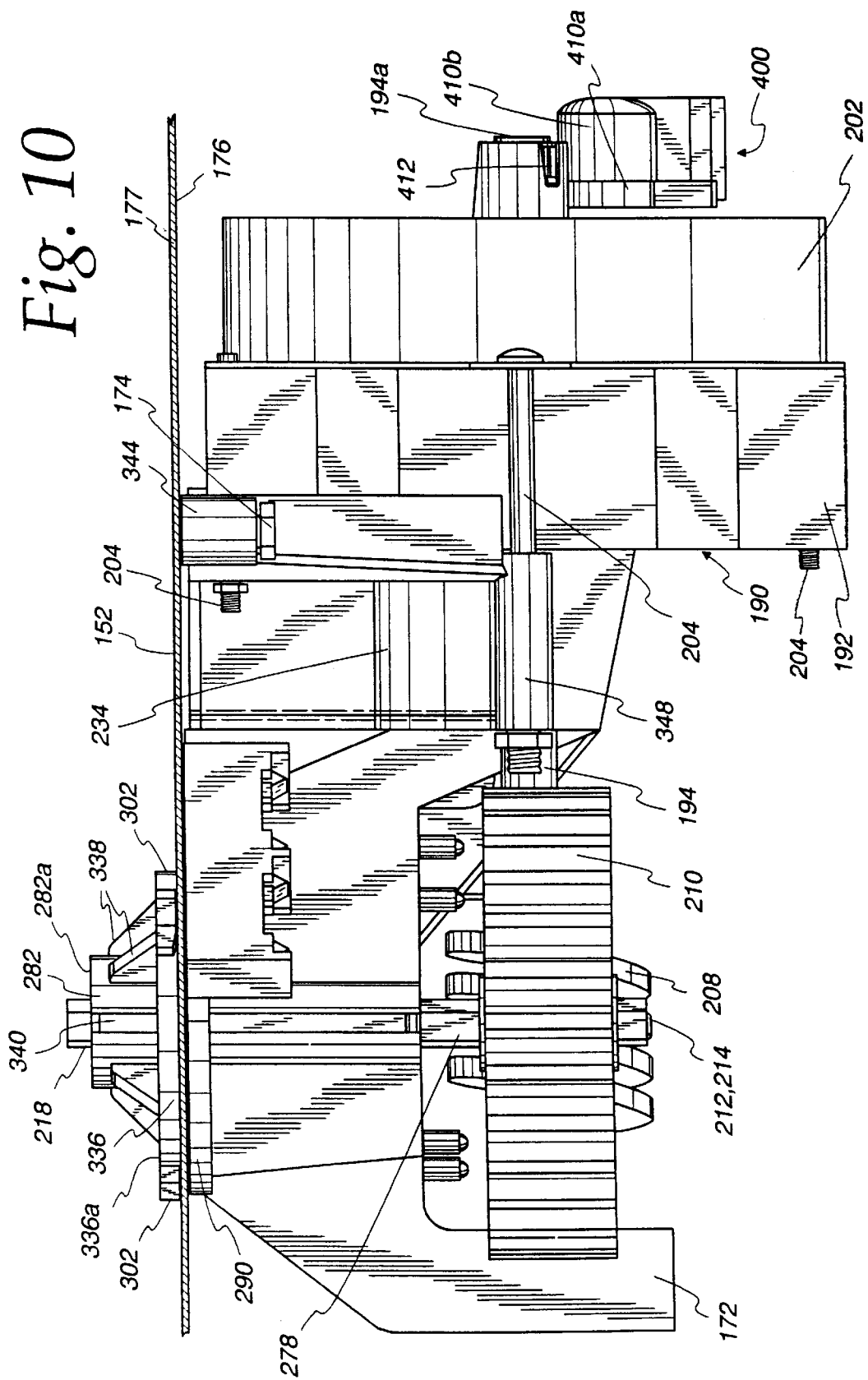
FIG. 10 is a side elevational view thereof.

Referring particularly to FIGS. 8–10, an arrangement for bayonet mounting of the integrated plastic housing to sheet metal chassis plate 152 is provided above wall 290. A series of tabs 302 extend in outward directions over slots 304 formed in wall 290. As shown in FIG. 8, the bayonet mounting structure generally indicated at 330, extends upward through a generally circular opening in chassis plate 152. Tabs 302 are inserted upward through slots 332 in chassis plate 152, and the housing is then rotated so that tabs 302 travel away from the slots 332. As shown in FIG. 10, this results in the chassis plate 152 being trapped between disc portion 290 and the tabs 302.

A generally cylindrical collar 336 extends above disc portion 290 and, as shown in FIGS. 9 and 11, for example, the tabs 302 extend outward from the top edge of collar 336. The collar 336 has an outer cylindrical surface for a close fit with the generally circular opening in the chassis plate. To add strength and rigidity to the bayonet mounting structure, generally triangular gussets 338 beneath adjoin disc portion 290 and cylindrical wall 282, and, as shown in FIG. 14, for example, additional reinforcing walls 340 aligned with transverse wall 272 extend to the top edge 282a of cylindrical wall 282. In this manner, the transmission shaft 278 received in the central bore 280 of cylindrical wall 282 is firmly supported along its length.

To secure the housing in position, suspended from the chassis plate 152 by the bayonet mounting arrangement, fasteners such as screws may extend through one or more cylindrical bores on the housing and through corresponding holes in the chassis plate 152.

In the embodiment shown in FIGS. 9–16, lugs 344 having hollow bores for receiving threaded fasteners, are used to secure the integrated housing 172 to the chassis plate 152. Two mounting lugs are employed, one located adjacent the stator, and the second located diagonally opposite the first.

Referring to FIGS. 9 and 14, a pair of mounting lugs 348 are provided at the lower corners of forward wall 232, and apertures 350 are located near the upper corners of forward wall 232 to secure the rear end bell 202 and the stator to the plastic housing using threaded fasteners 204.

As shown in FIG. 9, a recess is provided forward of the laminations of stator 192 to accommodate motor windings extending rearwardly of the stator laminations. In the preferred embodiment, electrical leads (not shown) extend from these windings to electrical contacts (not shown) mounted in terminal block 358. Referring to FIGS. 12 and 13, the terminal block 358 is supported on arms 360 which extend from walls 272, 286. A generally U-shaped clip 364 may be provided for mounting a capacitor.

As can be seen from the above, the integrated plastic housing provides a global, or complete, close tolerance mounting for all of the major drive system components, eliminating the need for iterative adjustments of pairs of drive system components, thereby reducing assembly time. Various features described above regarding the preferred construction of the integrated plastic housing help contribute to the precise alignment between stator, rotor, and transmission output shaft needed to function together as an effective reliable system.

Pass Point System

Systems for controlling drive operators for movable barriers (such as gates, fences and doors operated with a jack shaft mechanism) will now be described with reference to one type of movable barrier, the overhead garage door 12 shown in FIG. 1. In FIG. 1 a closed loop drive member preferably comprising a chain is carried on integrated drive rail 22 and is powered by drive unit 20. As the chain is moved back and forth along integrated drive rail 22, a trolley 28 attached to the chain is moved back and forth along the drive rail carrying arm 26 which is coupled to the trolley. The door 12 is then pulled or pushed by arm 26, while supported for travel along a defined path by guide rails 14.

Certain questions relating to control strategies arise when automatic operation of the garage door is considered. For example, for practical automatic control, consideration must be given to the prediction and/or recognition of fully opened and fully closed positions of door 12. Direct detection of door open and closed positions can be employed but generally are not preferred. Alternatively, arrangements may be provided for indirect detection of the door position. To a rough approximation, the position of the trolley 28, and hence of the chain driving the trolley, is related to the door position. However, due to wear, or due to changes in humidity, temperature or other conditions, the relationship of the chain or trolley position to the door position may vary somewhat. In the past, portions of the trolley or other components of the overhead opener system have been employed to physically contact electrical switches or the like to send signals related to the door position. However, the mechanical operations internal to the electrical switches (which have a direct influence on the electrical performance of the switch contacts) are subject to degradation caused by wear and exposure to the surrounding environment, as well as changes in climatic conditions. As a result, the set points received by the control system in order to predict or otherwise detect the door position may be susceptible to drifting from their proper settings, and under automatic operation, the overhead door would not always close or open as desired. This would require manual adjustment, usually with the aid of a ladder and tools, to manually change the positions of stop members or other components used to trip the electrical switches.

In the preferred embodiment of the invention, there is provided a means for detecting a reference recalibration point or pass point, preferably an objective point associated with an intermediate position of the garage door. With the preferred embodiment of the invention, sensing of the pass point is repeatable to a high degree of precision so that the pass point can be useful as a control parameter. By establishing a pass point at an intermediate door position, travel of the drive element (e.g., drive chain 60 described above) can be broken into two parts, one associated with a door closed position and the other associated with a door open position. The end points of door travel are defined relative to the pass point. Preferably, the pass point is sensed each time the door travels between its closed and open positions, with the pass point system being continually reset or recalibrated.

With an intermediate pass point being objectively and reliably sensed, predictions can be made "on the fly" as to when a door closed or door open condition is about to be reached. This information can be correlated with instantaneous demands being made on a motor providing mechanical power to the drive element and, if desired, interpretation can then be made as to the operating conditions relating to the door. For example, if a garage door is a fraction of an inch away from being fully closed and an unusual power demand is made on the drive motor, it may be assumed that the operating condition of the door relates to a misalignment of the door guide rails, snow build-up or some other factor unrelated to a mechanical or control malfunction.

Preferably, the pass point system provides the controller with RPM information as well as sensing the pass point, so that the controller may begin to decelerate the door as it approaches a desired end point, and may vary the point at which deceleration begins, depending on the speed of the door as reflected by the rotational velocity of the motor drive shaft.

By monitoring drive motor torque and a representative sampling of door opening and door closing operations, a length of travel from pass point to end point can be determined and stored for future use, along with stored values of end point deviations. Alternatively, a manufacturer can provide a simplified semiautomatic set-up in which user intervention is required only for confirmation of a desired end point condition. Such user confirmation can be inputted, for example, by using a conventional wall mounted switch 32 shown in FIG. 1 or a hand held transmitter unit 38, also shown in FIG. 1.

Pass point information may be obtained in several ways. For example, an arm may be attached to the drive chain 60. A switch mounted to a fixed position on the drive rail may be positioned so as to be tripped by the arm, thus providing a signal to the control system that a pass point has been detected. From that point on, movement of some portion of the drive system can be monitored to determine the position of the door being controlled. The use of an intermediate pass point may overcome problems of drift encountered in control systems where only the end points of door travel are detected. In essence, in the embodiment described herein, end point drift problems can be substantially eliminated and, as a control measure, a signal developed at the pass point can be relied upon as a base point to control operations relating to the length of travel to an end point.

Although mechanical sensors can be used to detect the pass point, as outlined above, in the illustrated embodiment the pass point is detected optically in order to eliminate problems such as contact deterioration associated with electrical switches or other mechanical detectors. An optical transmitter/receiver unit could be located on the support rail, and could be tripped by an opening in a drive element. Alternatively, the drive chain (or cable or other drive element) could carry a light-blocking or light-reflective "flag" which would interrupt or redirect the signal between the transmitter and receiver units. However, in the illustrated embodiment, the pass point system is preferably located within the power drive unit 20. This eliminates the need for separate installation of pass point system components, and also protects components such as optical sensors from inadvertent contact and environmental contamination.

The optical pass point herein is detected by monitoring rotation of a drive element, such as a gear or shaft, within the power head, and it is preferred that the motor drive shaft be directly monitored.

Referring now to FIGS. 17–24 and also to FIGS. 9 and 10, a pass point detector system generally indicated at 400 is provided adjacent the end bell of the motor. Referring to FIG. 10, the pass point detector system 400 is preferably mounted on end bell 202 so as to receive motor shaft 194. In the preferred embodiment, slots 404 are formed in end bell 202 along with an aperture 406 through which motor drive shaft 194 passes. A pass point assembly housing 410 provides rotatable mounting for a pinion or drive gear 412 which is keyed or otherwise coupled to motor drive shaft 194 for non-slip rotation therewith. Housing 410 includes a bayonet mounting arrangement with locking ears 414 which are received in slots 404 of the motor end bell so as to lock housing 410 thereto.

Figure 24:
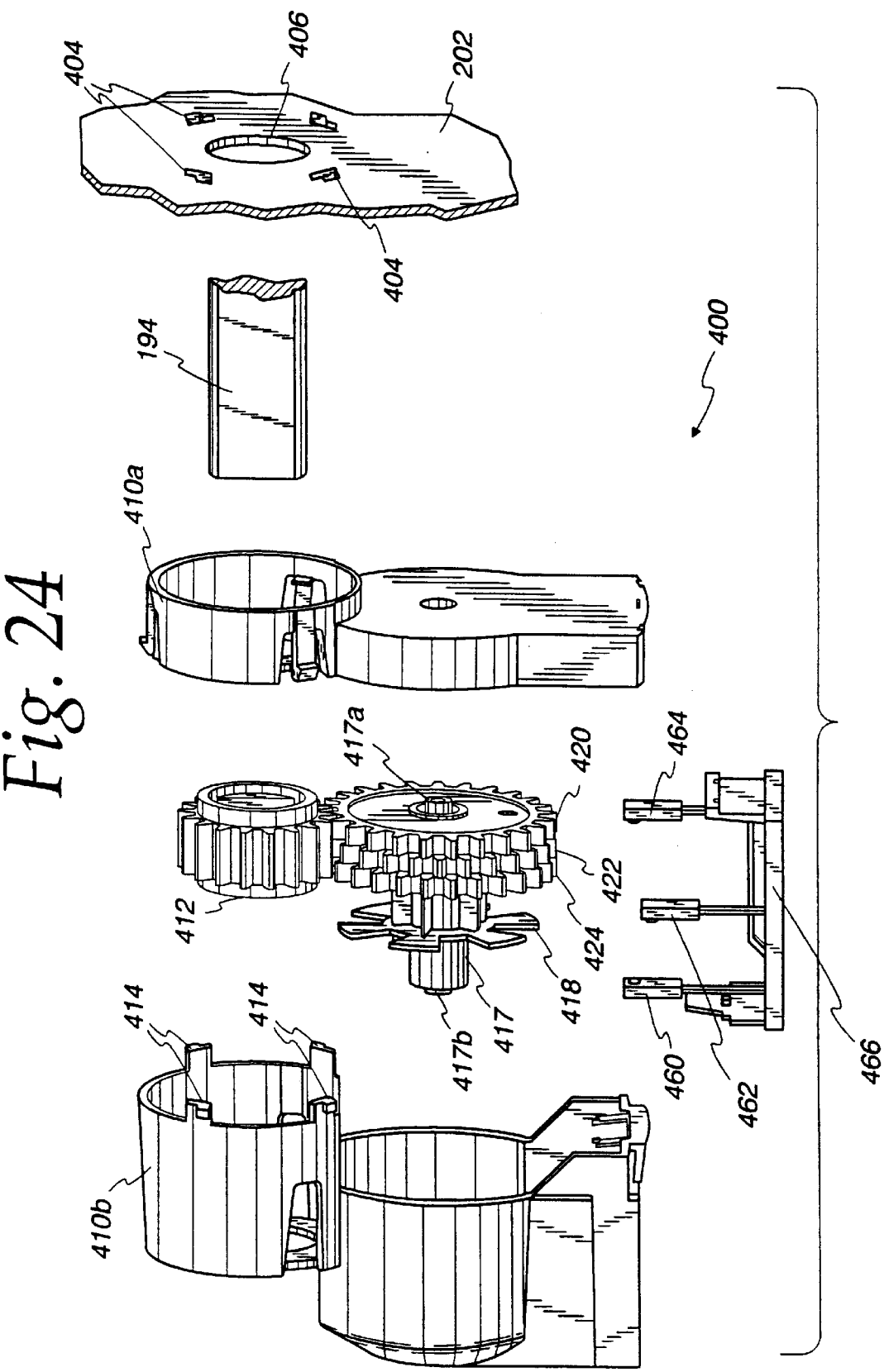
FIG. 24 is an exploded perspective view thereof.

With reference to FIG. 24, housing 410 is preferably comprised of two portions 410a and 410b. A shaft 417 has a first end 417a rotatably supported in housing portion 410a and a second end 417b rotatably supported in housing portion 410b. A segmented or chopper disc 418 and spur or timing gears 420–424 are mounted on shaft 417. Timing gear 420 and chopper disc 418 are fixed to shaft 417 for non-slip rotation therewith, whereas timing gears 422, 424 are free to rotate about shaft 417.

Figure 18:
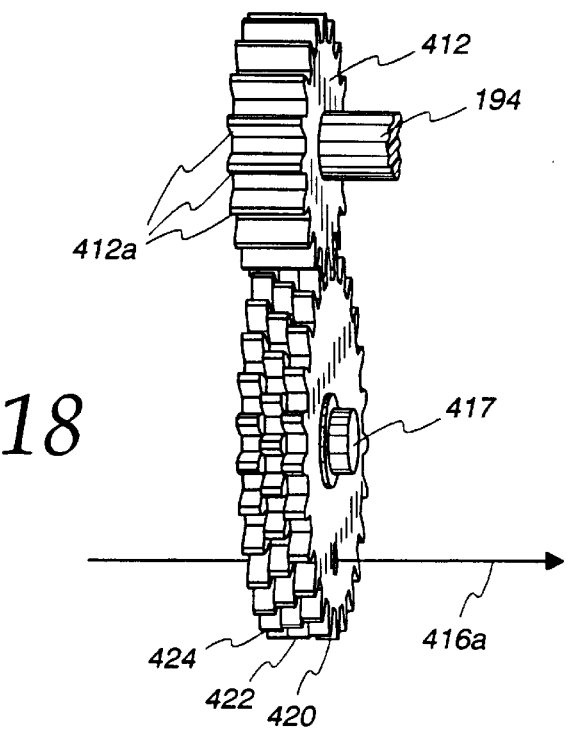
FIG. 18 is a fragmentary perspective view of the gear system portion of the pass point mechanism.
Figure 20:
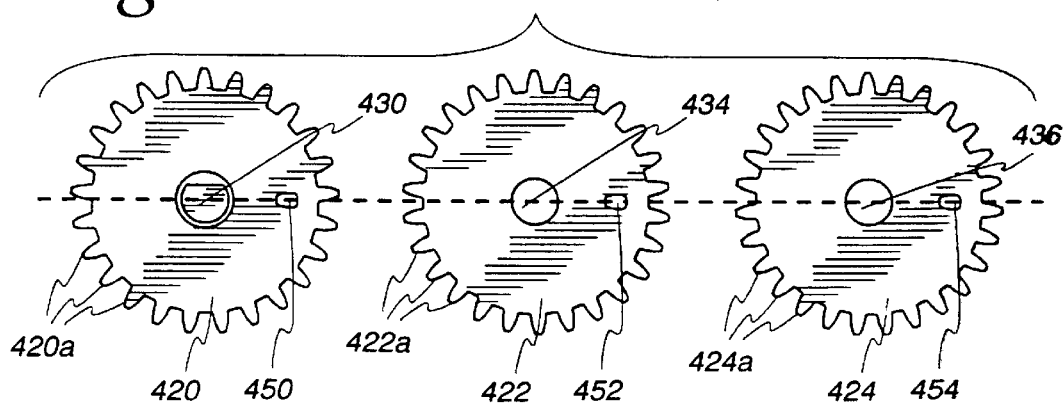
FIG. 20 is an elevational view of the timing gears thereof.

The timing gears 420–424 are illustrated in FIG. 20. Timing gear 420 has a central bore 430 which is keyed for non-slip rotation with mounting shaft 417. Timing gears 422 and 424 have smooth central bores 434, 436, respectively, so as to freely rotate about shaft 417. Timing gears 420–424 have slightly different numbers of teeth 420a–424a, respectively. For example, in one particular embodiment, timing gear 420 has 27 teeth whereas timing gears 422, 424 have 26 and 25 teeth, respectively. As indicated in FIGS. 18 and 22, for example, the teeth of timing gears 420–424 engage the drive teeth 412a of a common pinion or drive gear 412. FIG. 22 is an end view of the intermeshed gears shown in FIG. 18.

Figure 19:
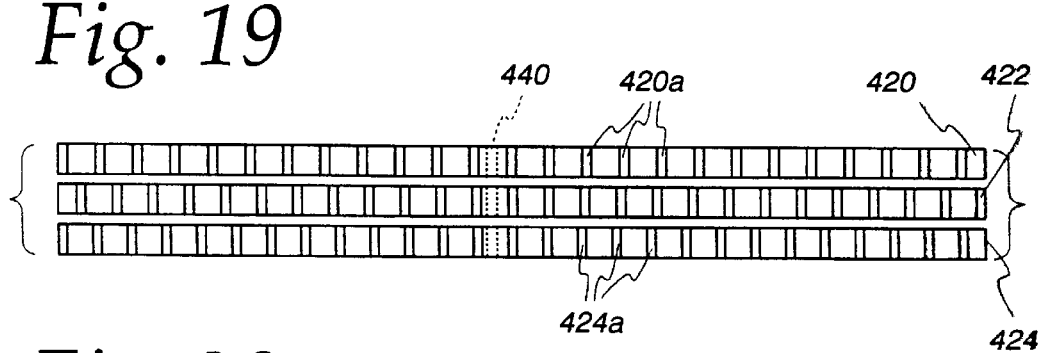
FIG. 19 is a schematic view of the timing gears thereof.

As can be seen in FIG. 22, the timing gears 420–424 have the same outer diameter for simultaneous intermeshing with the drive gear 412. The lowermost teeth 440 of common drive gear 412 simultaneously engage adjacent uppermost teeth of timing gears 420–424. Accordingly, the teeth of the timing gears are substantially aligned with one another at the point of contact with driving gear 412. This alignment is schematically indicated in FIG. 19 in which the teeth of the timing gears are laid out in a coplanar depiction, similar to that of a cylindrical projection. The broken lines 440 in FIG. 19 indicate the position of the lowermost tooth 440 of drive gear 412. As indicated in FIG. 22, due to the common alignment of timing gears 420–424 at their bottom positions, there is an increasing misalignment of drive gear teeth as the top of the timing gears is approached.

Referring again to FIG. 20, the timing gears 420–424 have relatively small sized holes or apertures 450–454, respectively, located at the same radii from their respective centers of rotation. When apertures 450–454 are aligned, they form a common passageway through all three timing gears, as indicated by the light beam 416 passing through the timing gears in a leftward direction. FIG. 21 shows the timing gears 420–424 in partial cross section, with the apertures 450–454 aligned. As indicated in FIG. 21, it is generally preferred that the apertures 450–454 have similar dimensions such that the common passageway resulting from their alignment has generally constant cross-sectional dimensions. As can be seen in FIGS. 20 and 22, the apertures and the timing gears have an approximate size of the width of one of the teeth of those timing gears.

In one embodiment of the invention, the gear configurations are selected so that alignment of the apertures will occur about once every nine hundred rotations of rotor shaft 194, so that such alignment will occur only once during travel of the door through its full range of motion between its open and closed positions. With rotation of rotor drive shaft 194 in either direction, the alignment indicated in FIGS. 18, 21 and 22 will be interrupted as the apertures of all three timing gears will no longer be aligned with one another. However, with an equal reverse rotation of rotor shaft 194, the alignment will be restored in a precise, unchanging manner, unaffected by external conditions. The approximately 1:900 ratio identified above is given only as an example, and other ratios may be employed in other embodiments.

Referring now to FIG. 23, an emitter 460 is located to one side of chopper wheel 418 and is positioned so as to direct a beam or signal through the teeth of the chopper wheel. A first receiver 462 is located between the chopper wheel 418 and timing gears, while a second receiver 464 is located beyond the timing gears. In the preferred embodiment, the emitter 460 and receivers 462, 464 operate with optical beams or signals such as infrared beams or signals, although other types of devices transmitting beams in other wavelengths could also be used. The emitter may comprise a light-emitting diode (LED).

Figure 17:
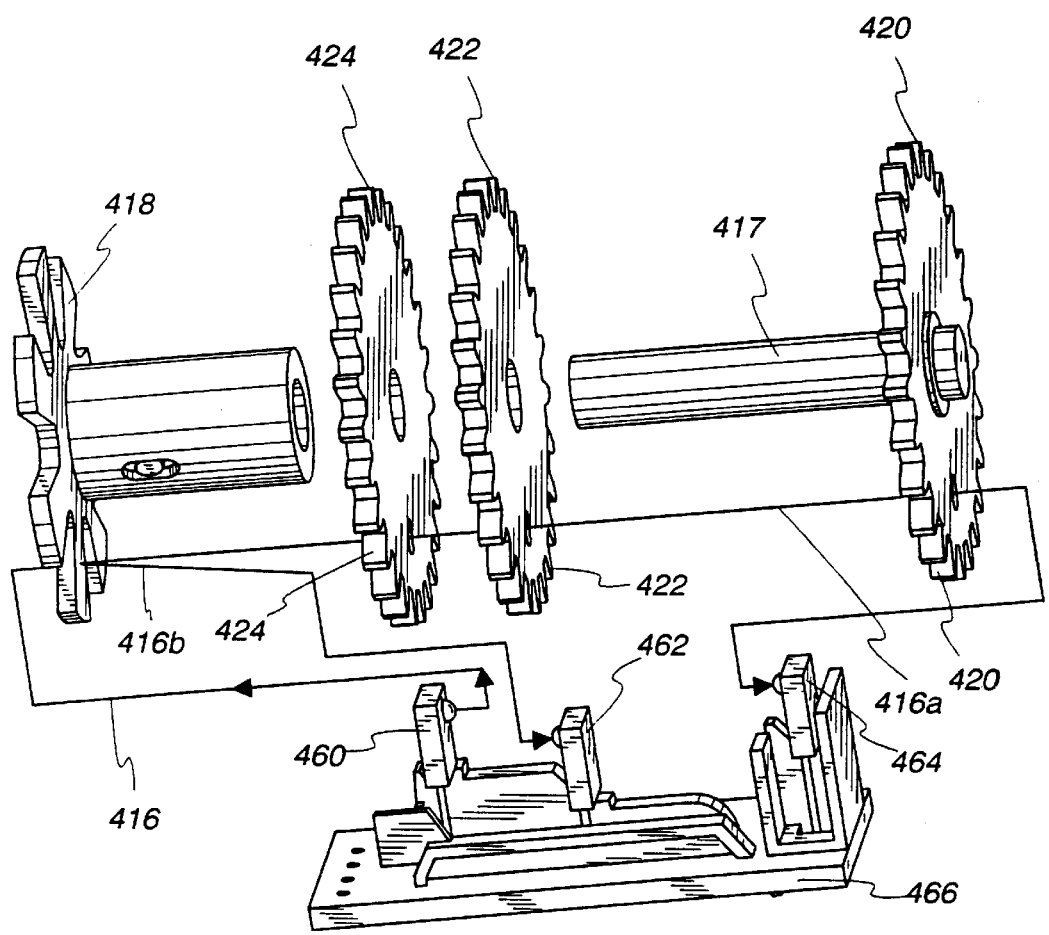
FIG. 17 is an exploded perspective view of a pass point mechanism.

With reference to FIGS. 17 and 24, the emitter 460 and receivers 462, 464 are mounted on a common base 466, which is received within the lower portion of housing 410 and which maintains the emitter and receivers in desired alignment with the chopper wheel and timing gears, as described above.

As indicated schematically in FIG. 17, a light beam 416 passes between the teeth of chopper wheel 418. A portion of the beam indicated by line 416a passes through the aligned passageways in timing gears 420, 424 so as to be received by receiver 464. A second portion of the energy from transmitter 460 indicated by line 416b is received by the first receiver 462 without passing through the timing gears.

Chopper wheel 418 operates in a known manner to divide the rotations of shaft 417 into multiple portions so as to cause a series of flashes to be detected by receiver 462. The number of teeth on the chopper wheel may be increased if desired in order to obtain a greater resolution of the angular displacement of shaft 417. In the preferred embodiment, the chopper wheel 418 is fixed to shaft 417 for non-slip rotation therewith, in a manner similar to the mounting of timing gear 420. Thus, both timing gear 420 and chopper wheel 418 are, in a rotational sense, locked together. Due to the interengagement of teeth 420a, 412a, rotation of the chopper wheel is directly related to rotation of rotor shaft 194 in a non-slip manner. Thus, by taking into account gear ratios in a known manner, rotation of rotor shaft 194 can be directly determined by counting the pulses sensed by receiver 462.

Upon receipt of a signal passing through the timing gears 420–424, receiver 464 triggers a signal to appropriate circuitry that the pass point is detected. In the preferred embodiment, the controller to which the emitter 460 and receivers 462, 464 are coupled counts pulses detected by each receiver. A pulse detected by receiver 464 indicates the detection of the pass point and provides a known reference indication to the controller. The number of pulses detected by receiver 462 will indicate the amount of rotation of rotor output shaft 194 away from the pass point condition, thereby measuring displacement of the door. The controller uses the information provided by receivers 462 and 464 to bring the door to a stop at a preset open or closed position, without automatic reversal of the door. The pass point is independent of external physical components of the movable barrier system, and can therefore be used as a reliable objective basis for automatic control of the moving door.

In other embodiments, instead of employing a single emitter and a pair of receivers, the apparatus may employ a single receiver and a pair of emitters, with the emitters being rapidly switched on and off by the controller so that, at any particular time, one emitter is on and the other is off. The controller can then determine the source of each pulse sensed by the receiver. The emitter may comprise LED's or other light sources.

In addition to enabling limits of travel to be set and maintained with precision, additional functions can be performed with the information provided by the pass point system. For example, the pulses detected by receiver 462 may be counted, and the number stored for each fully opened and fully closed position attained by garage door 12. Differences in the number of counts detected to attain a fully closed or fully opened door position can, with improved confidence, be correlated to door position. Criteria can be established for the maximum allowable deviation of pulses detected in receiver 462, subsequent to attaining the pass point condition, needed to attain an open or closed door position. Upon excursion beyond the maximum allowable limit, corrective action can be taken.

As will be appreciated from studying the description and appended drawings, the present invention may be directed to operator systems for movable barriers of many types, such as fences, gates, overhead garage doors, and the like.

The drawings and the foregoing description is not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. An overhead door opener drive system comprising a housing, a motor supported on said housing, a pass point assembly carried on the housing for measuring overhead door displacements with respect to an intermediate reference point, and a controller for controlling and repeatably setting limits for such displacements within a predetermined range of motion to limit undesired variation of door displacement limits over time;

said pass point assembly comprising at least one transmitter, at least one receiver in communication with said controller, and a sensor mechanism driven at least indirectly by said motor for selectively altering communication between said at least one receiver and said at least one transmitter to provide a reference point signal to the controller when the door passes said reference point and to provide information to the controller concerning overhead door displacements relative to said reference point; and said controller enabling setting and adjustment of said limits from a location remote from said pass point assembly.

2. The system of claim 1 further comprising a gear box driven by said motor, said sensor mechanism being supported by one of said motor and said gear box.

3. The system of claim 1 wherein said motor includes a motor shaft and said gear box includes a gear shaft drivingly coupled to said motor shaft.

4. The system of claim 3 wherein said sensor mechanism is driven directly by one of said motor shaft and said gear shaft.

5. The system of claim 4 wherein said sensor mechanism is driven directly by said motor shaft.

6. The system of claim 4 wherein said motor shaft has two opposed ends with the gear box drivingly coupled to one of said ends and the sensor mechanism connected to the other end.

7. The system of claim 1 wherein said sensor mechanism comprises a plurality of sensing members movable into a pre-selected alignment with each other so as to selectively alter communication between at least one receiver and said at least one transmitter.

8. The system of claim 7 wherein said sensing members comprise gears movable when driven at least indirectly by said motor.

9. An operator for opening and closing a barrier comprising a head, a transmission assembly for transmitting power from said head to said barrier, and a controller;

said head comprising a base, a motor supported on said base and connected to said transmission assembly, and a limit system;

said controller being in communication with said motor and said limit system to control motor operation and thereby to control barrier travel;

said controller being capable of setting and adjusting a limit point from a remote location so that, upon entry of a command into said controller, said barrier will automatically travel approximately to said limit point and will stop approximately at said limit point; and said limit system comprising a pass point system which is a component of said head and which is installable therewith so as to avoid requiring separate installation of said limit system.

10. An operator in accordance with claim 9 wherein said pass point system comprises at least one transmitter, at least one receiver in communication with said controller, and a sensor mechanism driven at least indirectly by said motor for selectively altering communication between said at least one receiver and said at least one transmitter to provide a signal to said controller.

11. The system of claim 10 wherein said sensor mechanism comprises a plurality of sensing members movable into a pre-selected alignment with each other so as to selectively alter communication between at least one receiver and said at least one transmitter.

12. The system of claim 11 wherein said sensing members comprise gears movable when driven at least indirectly by said motor.

13. An operator in accordance with claim 11 wherein said sensing members comprise a plurality of side-by-side interrupter gears driven by said motor, said interrupter gears having slightly different numbers of teeth and having apertures therein which may be aligned with one another to permit passage of an signal when the barrier is at a particular location to define a single reference point.

14. An operator in accordance with claim 13 which is automatically reversing in response to detection of an obstruction to barrier travel toward a closed position.

15. An operator for opening and closing a barrier comprising a head, a transmission assembly rail drive assembly and trolley for transmitting power from said head to said barrier, and a controller;

said head comprising a base, a motor supported on said base and connected to said transmission assembly, and a limit system;

said controller being in communication with said motor and said limit system to control motor operation and thereby to control barrier travel;

said controller being capable of setting a limit point so that, upon entry of a command into said controller, said barrier will automatically travel approximately to said limit point and will stop approximately at said limit point;

said limit system being a component of said head and installable therewith so as to avoid requiring separate installation of said limit system; and said limit system comprising a pass point system which defines an intermediate reference point and which sends a signal to said controller when said intermediate reference point is passed so that subsequent displacement may be measured with respect to said intermediate reference point.

16. An operator in accordance with claim 15 wherein said pass point system comprises at least one transmitter, at least one receiver in communication with said controller, and a sensor mechanism driven at least indirectly by said motor for selectively altering communication between said at least one receiver and said at least one transmitter to provide a signal to said controller.

17. The system of claim 16 wherein said sensor mechanism comprises a plurality of sensing members movable into a pre-selected alignment with each other so as to selectively alter communication between at least one receiver and said at least one transmitter.

18. The system of claim 17 wherein said sensing members comprise gears movable when driven at least indirectly by said motor.

19. An operator in accordance with claim 17 wherein said sensing members comprise a plurality of side-by-side interrupter gears driven by said motor, said interrupter gears having slightly different numbers of teeth and having apertures therein which may be aligned with one another to permit passage of a reference signal when the barrier is at a particular location corresponding to said intermediate reference point.

20. An operator in accordance with claim 19 which is automatically reversing in response to detection of an obstruction to barrier travel toward a closed position.

21. An operator in accordance with claim 15 wherein said rail drive assembly is integrated and comprises:

an elongated substantially rigid rail having opposed ends;

a pair of rotary support members rotatably supported by said rail at opposite ends of said rail;

an elongated flexible linear drive member supported on said rotary support members for attachment to said trolley, said trolley being supported on said rail and connected to said elongated flexible drive member for travel on said rail so that it may be driven along said rail by said elongated flexible linear drive member;

said integrated rail drive assembly having connection means to enable an end thereof to be connected to said chassis; and at least one of said rotary support members having a socket formed therein, the socket defining a recess having a cross-section which is non-circular and which has a shape complementary to that of said drive shaft end to receive said drive shaft end for connection of said at least one of said rotary support members to said drive shaft end.

22. An operator in accordance with claim 21 wherein said elongated, substantially rigid rail comprises a unitary integral rail continuously extending between its opposed ends.

23. An operator in accordance with claim 22 wherein said elongated, substantially rigid rail is comprised of a plurality of rail sections joined end-to-end.

24. An operator in accordance with claim 23 further comprising one or more pre-installed guards on said rail adjacent said rotary support members.

25. An operator in accordance with claim 24 further comprising an auxiliary drive connected to the rotary support member opposite the one to which said drive shaft is connected.

26. An operator in accordance with claim 21 wherein said base comprises a one-piece integral housing rigidly supporting said motor and transmission assembly in predetermined relation to one another, said operator further comprising first and second bearings supported by said housing;

said motor comprising a stator, a rotor rotatably disposed within the stator, and a rotatable motor shaft supporting said rotor;

said transmission assembly comprising a first transmission component supported on said motor shaft, a transmission shaft, and a second transmission component supported on said transmission shaft in contact with said first transmission component;

said motor shaft being supported only by said first and second bearings, said first and said second bearings being disposed adjacent respective ends of said motor shaft, and said first transmission component being disposed between said bearings; and said integral housing engaging said stator and rigidly supporting at least one of said bearings relative to said stator to maintain precise tolerances with respect to clearance between the rotor and the stator without a bearing between said first transmission component and said rotor.

27. An operator in accordance with claim 26 wherein said integral housing consists essentially of a single, unitary molded plastic structure with stator supporting walls defining a large recess for engaging at least a portion of said stator, and wherein said stator has an exterior surface area engaging the stator supporting walls defining said recess, said stator supporting walls having an internal surface area complementary to said exterior surface area of said stator, with precise location of said stator relative to said integral housing being provided by a mechanical interface between said exterior surface area of said stator and said complementary surface area of said stator supporting walls.

28. An operator in accordance with claim 27 further comprising a chassis, wherein said integral housing includes a bayonet mount arrangement for mounting of said integral housing to said chassis.

29. An integrated rail drive assembly, to be driven by a drive shaft carried on or near a frame, to move a trolley along a predetermined path, comprising:

an elongated, substantially rigid rail having opposed ends and extending along said path;

a pair of rotary support members rotatably supported by said rail at opposite ends of said rail; and an elongated flexible linear drive member supported on said rotary support members for attachment to said trolley, said trolley being supported on said rail and connected to said elongated flexible drive member for travel on said rail so that it may be driven along said rail by said elongated flexible linear drive member;

a connector to enable an end of said rail to be connected to said frame to prevent rotation of said rail with respect to said frame; and at least one of said rotary support members having a socket formed therein, the socket defining a recess having a cross-section which is non-circular and which has a shape complementary to that of said drive shaft to receive said drive shaft for driving connection of said at least one of said rotary support members to said drive shaft.

30. An integrated rail drive assembly in accordance with claim 29 wherein said elongated, substantially rigid rail comprises a unitary integral rail continuously extending between its opposed ends.

31. An integrated rail drive assembly in accordance with claim 30 wherein said elongated, substantially rigid rail is comprised of a plurality of rail sections joined end-to-end.

32. An integrated rail drive assembly in accordance with claim 31 further comprising one or more pre-installed guards on said rail adjacent said rotary support members.

33. An integrated rail drive assembly in accordance with claim 32 wherein both of said rotary support members have a socket opening formed therein, the socket opening defining a recess having a cross-section which is non-circular.

34. An integrated rail drive assembly in accordance with claim 21 wherein said rotary support members comprise sprockets supported by said rail for rotation about a generally vertical axis.

35. A modular integrated rail drive assembly for use with a barrier operator system to move a trolley along a predetermined path, said integrated rail drive assembly adaptable for slip fit drive connection with a drive shaft of predetermined shape carried on or near a frame of the barrier operator system, the modular integrated rail drive assembly comprising:

an elongated, substantially rigid rail having, opposed ends and extending along said path;

a pair of rotary support members rotatably supported by said rail at opposite ends of said rail; and an elongated flexible linear drive member supported on said rotary support members for attachment to said trolley, said trolley being supported on said rail and connected to said elongated flexible drive member for travel on said rail so that it may be driven along said rail by said elongated flexible linear drive member;

a connector to enable an end of said rail to be connected to said frame to prevent rotation of said rail with respect to said frame; and at least one of said rotary support members having a socket formed therein, the socket defining a recess having a cross-section which is non-circular and which has a shape complementary to that of said drive shaft to receive said drive shaft for connection of said at least one of said rotary support members to said drive shaft.

36. A modular integrated rail drive assembly in accordance with claim 35 wherein said elongated, substantially rigid rail comprises a unitary integral rail continuously extending between its opposed ends.

37. A modular integrated rail drive assembly in accordance with claim 36 wherein said elongated, substantially rigid rail is comprised of a plurality of rail sections joined end-to-end.

38. A modular integrated rail drive assembly in accordance with claim 37 further comprising one or more pre-installed guards on said rail adjacent said rotary support members.

39. A modular integrated rail drive assembly in accordance with claim 38 wherein both of said rotary support members have a socket formed therein, the socket defining a recess having a cross-section which is non-circular.

40. An integrated rail drive assembly in accordance with claim 35 wherein said rotary support members comprise sprockets supported by said rail for rotation about a generally vertical axis.

* * * * *

UNITED STATES PATENT AND TRADEMARK OFFICE
CERTIFICATE OF CORRECTION

PATENT NO. : 6,414,454 B1
DATED : July 2, 2002
INVENTOR(S) : Lhotak et al.

It is certified that error appears in the above-identified patent and that said Letters Patent is hereby corrected as shown below:

Column 17,
Line 43, after "elongated" insert -- , -- (comma).

Column 19,
Line 20, change "21" to -- 29 --.

Signed and Sealed this

Twenty-fourth Day of December, 2002

JAMES E. ROGAN
*Director of the United States Patent and Trademark Office*